US008528993B2

(12) United States Patent
Janick et al.

(10) Patent No.: US 8,528,993 B2
(45) Date of Patent: Sep. 10, 2013

(54) SEALING STRUCTURE FOR SEALING MULTIPLE SECTIONS AND A DRAWER OF A MEDICAL EMERGENCY CART

(75) Inventors: James J. Janick, Hanover Township, PA (US); Robert R. Steele, Sweet Valley, PA (US)

(73) Assignee: Metro Industries Inc., Reno, NV (US)

( * ) Notice: Subject to any disclaimer, the term of this patent is extended or adjusted under 35 U.S.C. 154(b) by 339 days.

(21) Appl. No.: 13/001,181

(22) PCT Filed: Jun. 26, 2009

(86) PCT No.: PCT/US2009/048904
§ 371 (c)(1),
(2), (4) Date: Dec. 23, 2010

(87) PCT Pub. No.: WO2009/158642
PCT Pub. Date: Dec. 30, 2009

(65) Prior Publication Data
US 2011/0095661 A1    Apr. 28, 2011

Related U.S. Application Data

(60) Provisional application No. 61/076,462, filed on Jun. 27, 2008.

(51) Int. Cl.
*A61B 19/00*    (2006.01)
*E05B 65/46*    (2006.01)

(52) U.S. Cl.
USPC .......................................... 312/209; 312/218

(58) Field of Classification Search
USPC ............... 312/209, 215–219, 222, 296, 109, 312/290, 249.11; 280/47.35, 47.34; 292/121, 292/127, 137, 163, 166–168, 138, 139
See application file for complete search history.

(56) References Cited

U.S. PATENT DOCUMENTS

| | | | | |
|---|---|---|---|---|
| 1,368,048 A * | 2/1921 | Pilliod | .............................. | 70/69 |
| 1,984,345 A * | 12/1934 | Kennedy | ........................ | 312/290 |
| 2,286,427 A * | 6/1942 | Levensten | ..................... | 312/222 |
| 2,440,541 A * | 4/1948 | Pilliod | ........................ | 312/217 |
| 2,987,358 A * | 6/1961 | Roberts | ........................ | 312/216 |
| 3,862,775 A * | 1/1975 | Gudmundsen | ................ | 292/327 |
| 4,790,610 A | 12/1988 | Welch et al. | .................. | 312/218 |
| 5,102,209 A * | 4/1992 | Hesseltine | ..................... | 312/290 |
| 5,116,091 A * | 5/1992 | Swift | ............................ | 292/318 |
| 5,154,497 A | 10/1992 | Smith | ........................... | 312/215 |
| 5,482,162 A * | 1/1996 | Dickinson | ..................... | 206/373 |
| 5,645,332 A * | 7/1997 | Snoke et al. | ................. | 312/257.1 |
| 5,673,983 A | 10/1997 | Carlson et al. | ................ | 312/218 |
| 5,720,535 A | 2/1998 | Mehman | ........................ | 312/219 |
| 5,905,653 A | 5/1999 | Higham et al. | ............ | 364/479.14 |
| 6,158,830 A | 12/2000 | Johnson et al. | ................ | 312/218 |
| 6,328,355 B1 * | 12/2001 | Bortz | ......................... | 292/307 R |
| 6,375,235 B1 * | 4/2002 | Mehmen | ........................ | 292/128 |
| 6,788,997 B1 | 9/2004 | Frederick | ...................... | 700/236 |
| 7,296,808 B2 * | 11/2007 | Huguet | ....................... | 280/47.34 |

(Continued)

*Primary Examiner* — Janet M Wilkens
(74) *Attorney, Agent, or Firm* — Fitzpatrick, Cella, Harper & Scinto

(57) ABSTRACT

An emergency crash cart includes a sealing structure that enables multiple storage sections of the cart to be locked and sealed simultaneously. The locking structure enables one of the storage sections to be unlocked and unsealed without unlocking or unsealing the other storage sections. The locking structure also can be actuated to unlock and unseal all storage sections simultaneously for rapid access to the contents of all storage sections of the cart.

16 Claims, 28 Drawing Sheets

(56) References Cited

U.S. PATENT DOCUMENTS 8,157,337 B2 * 4/2012 Manalang et al. ......... 312/249.8
2005/0285360 A1 * 12/2005 Helin et al. ................ 280/47.34
2006/0181182 A1 * 8/2006 Hung ............................ 312/218
2011/0025006 A1 * 2/2011 Knoppers .................. 280/47.34

* cited by examiner

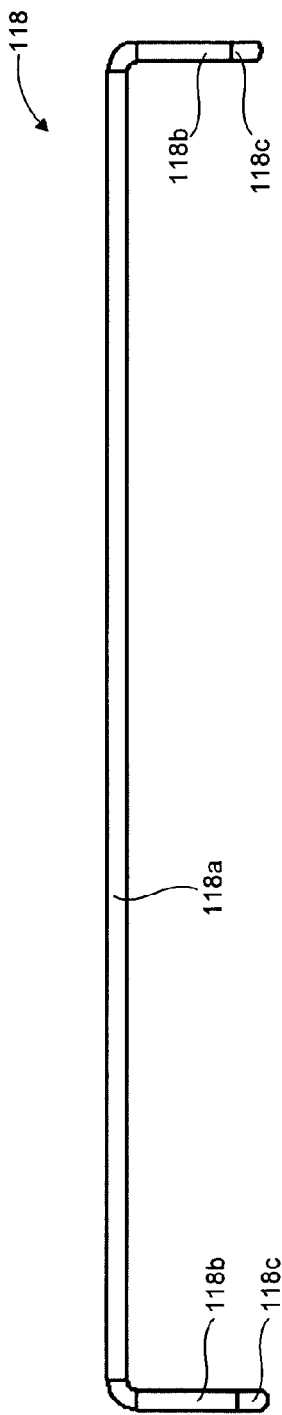
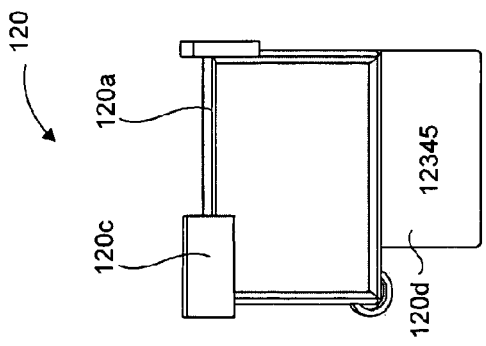
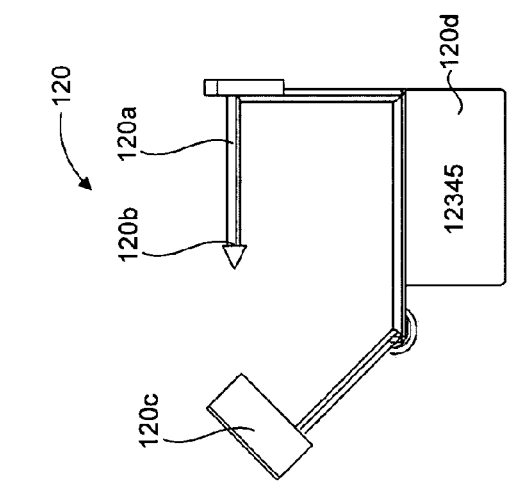
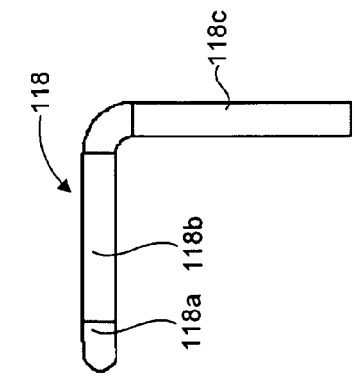
FIG. 7A
FIG. 8A
FIG. 8B
FIG. 7B

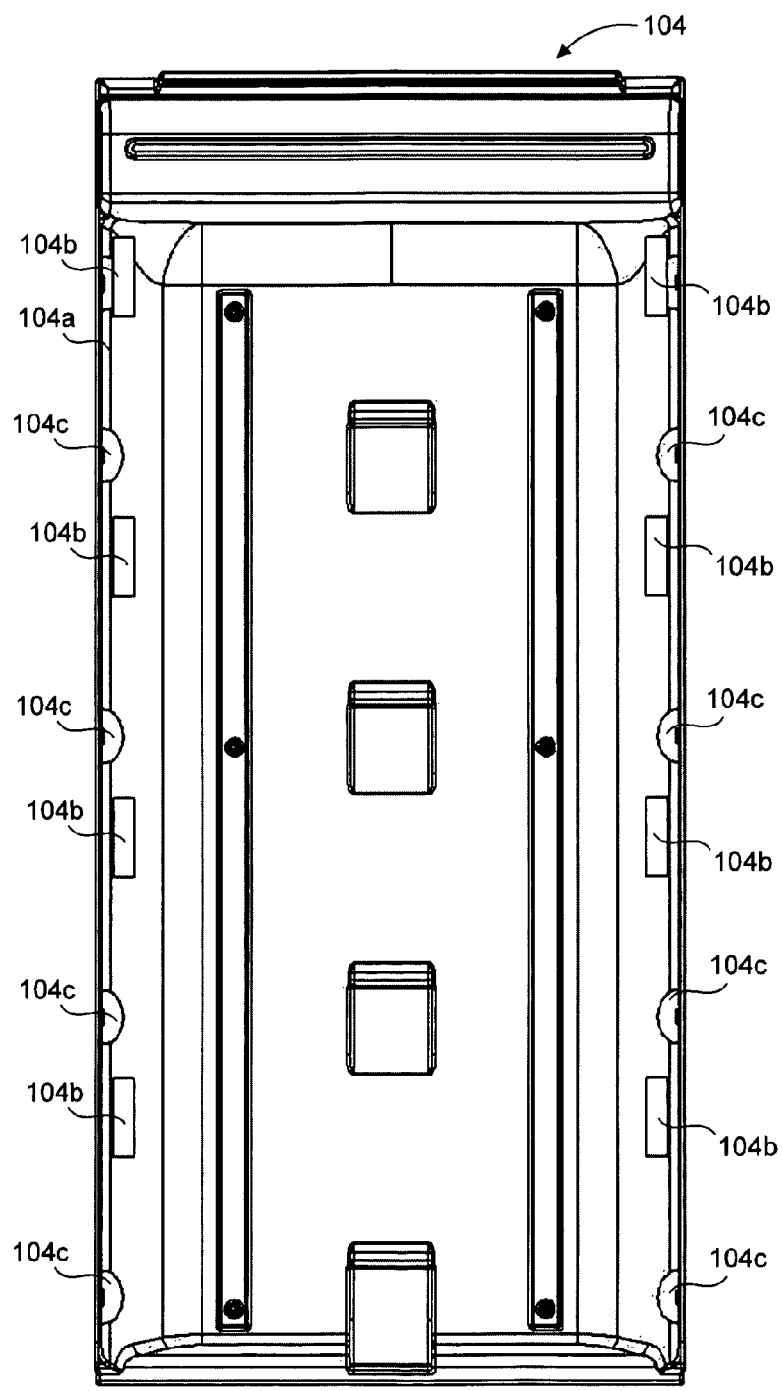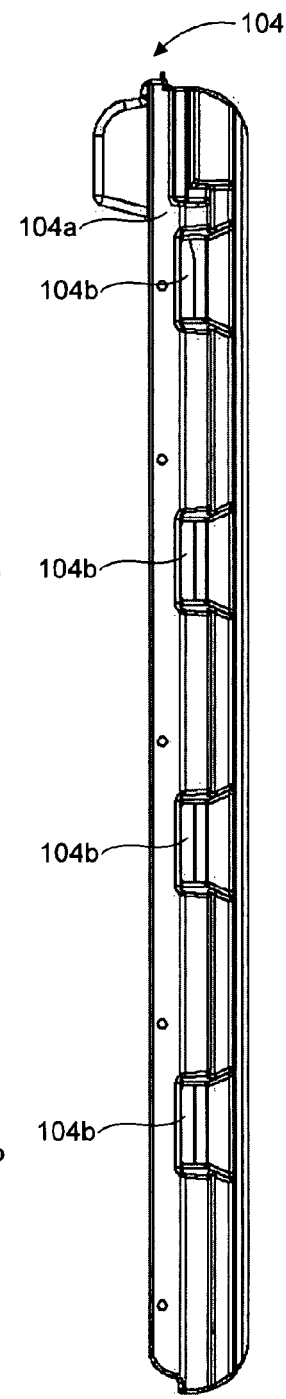
FIG. 10A
FIG. 10B

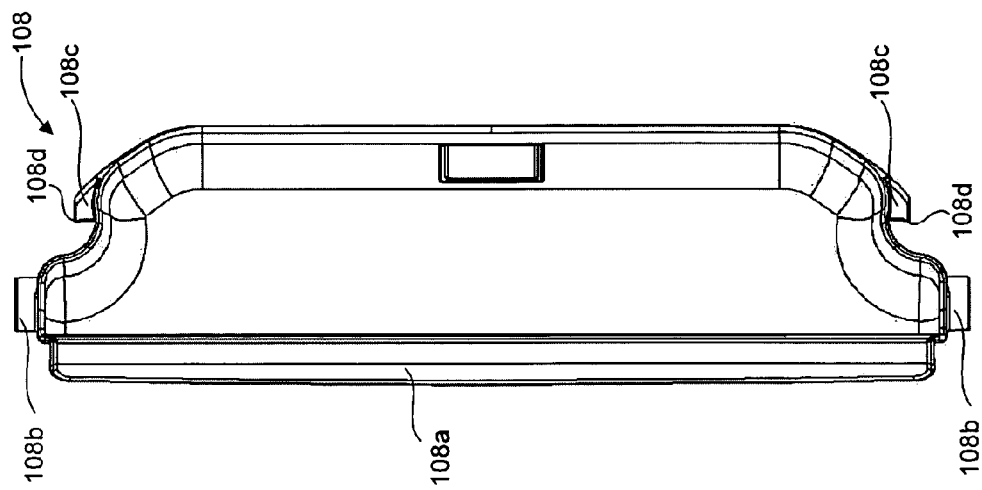
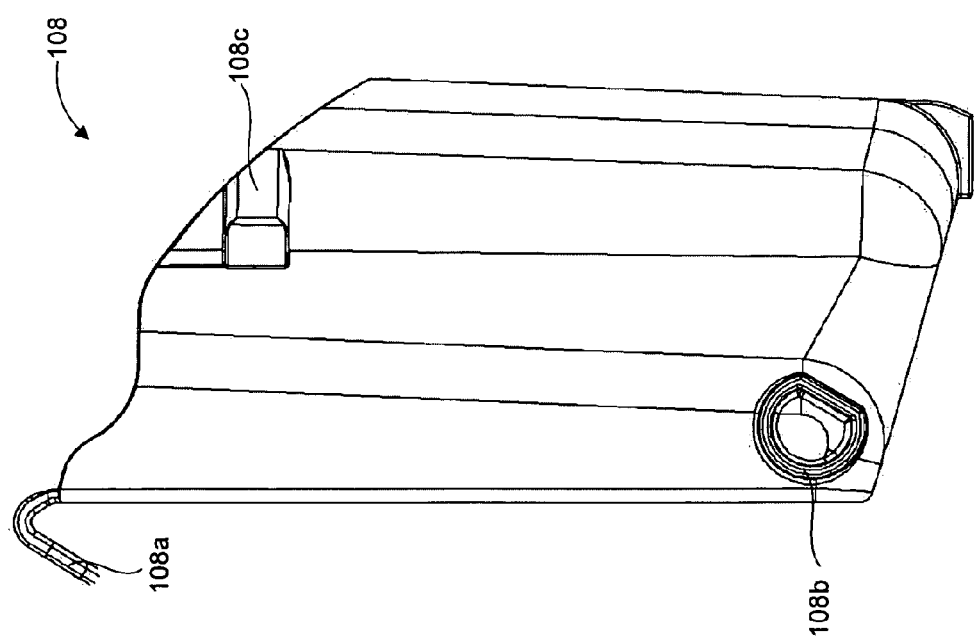

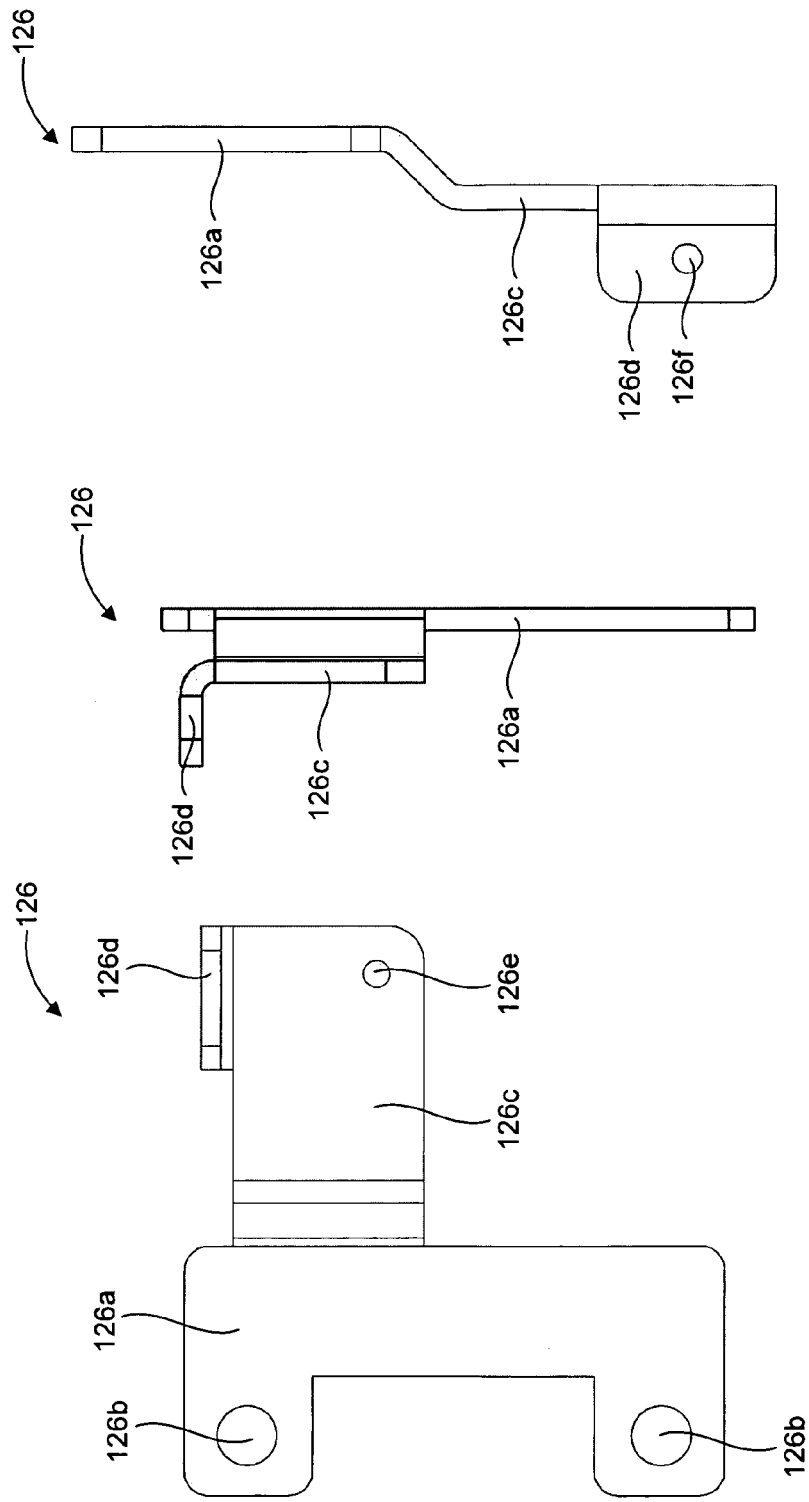

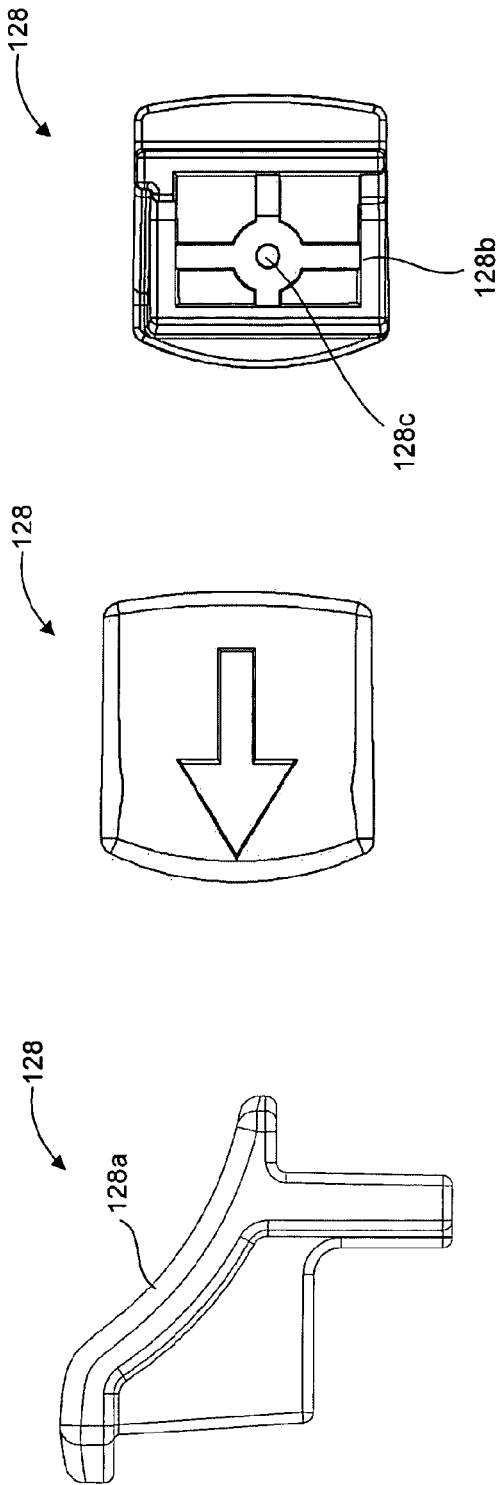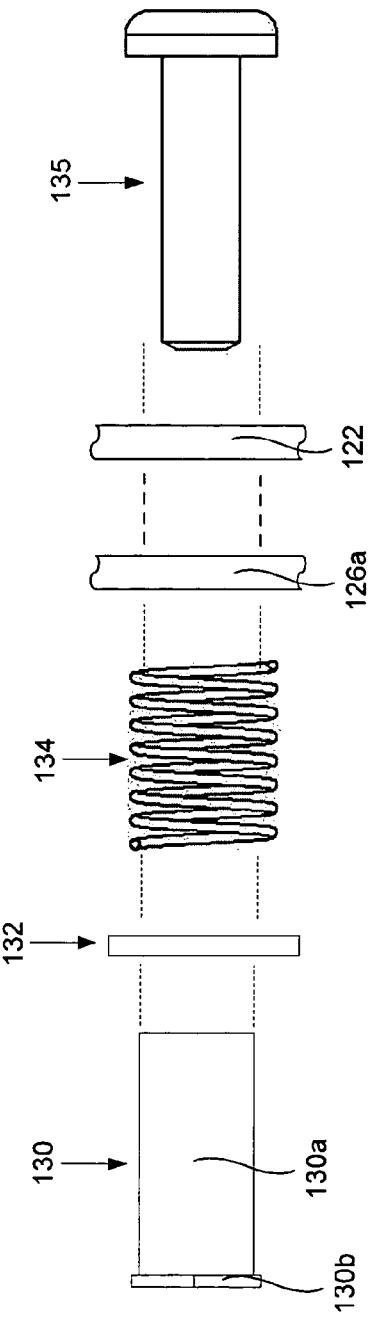
FIG. 15A
FIG. 15B
FIG. 15C
FIG. 16

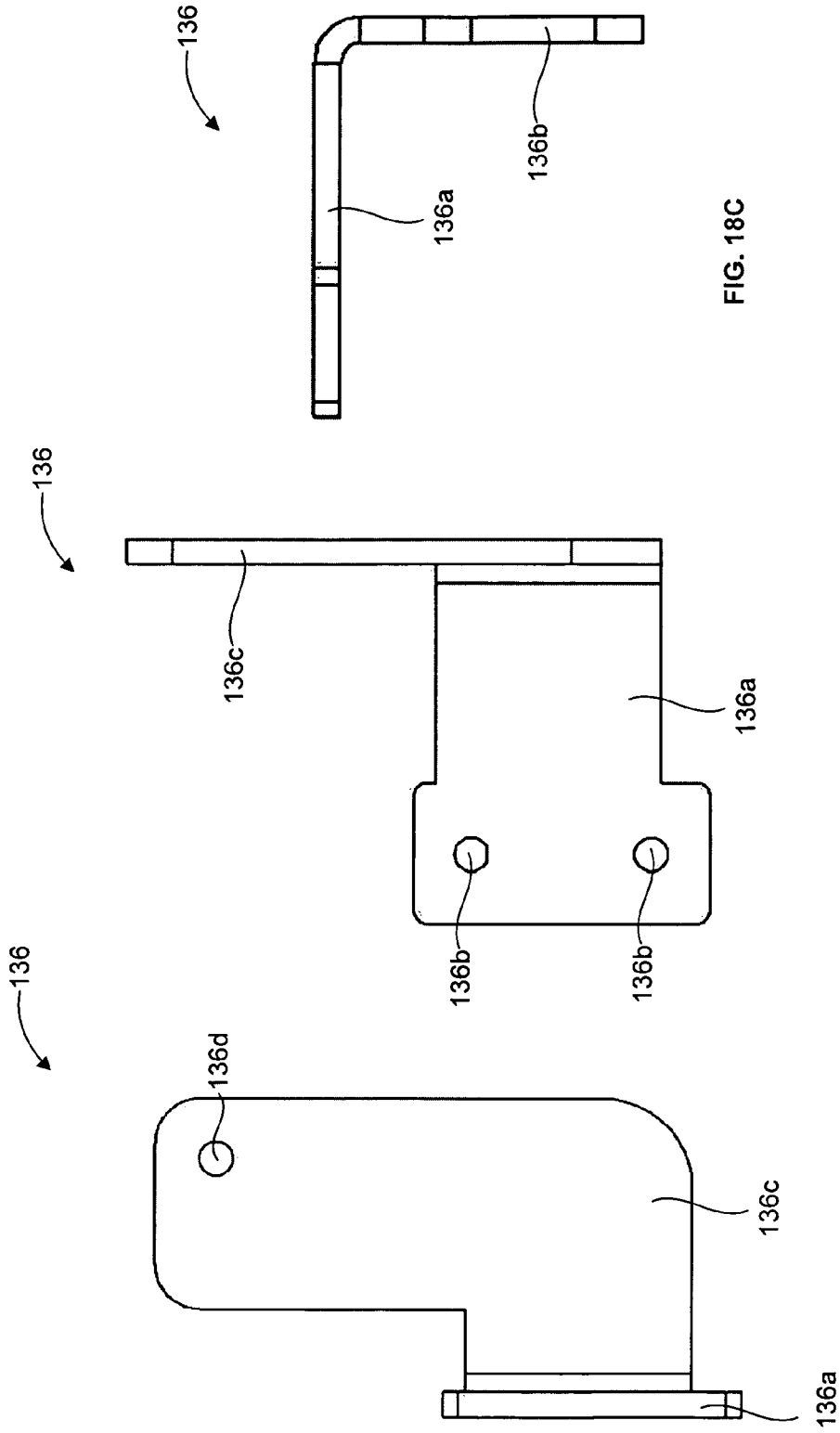

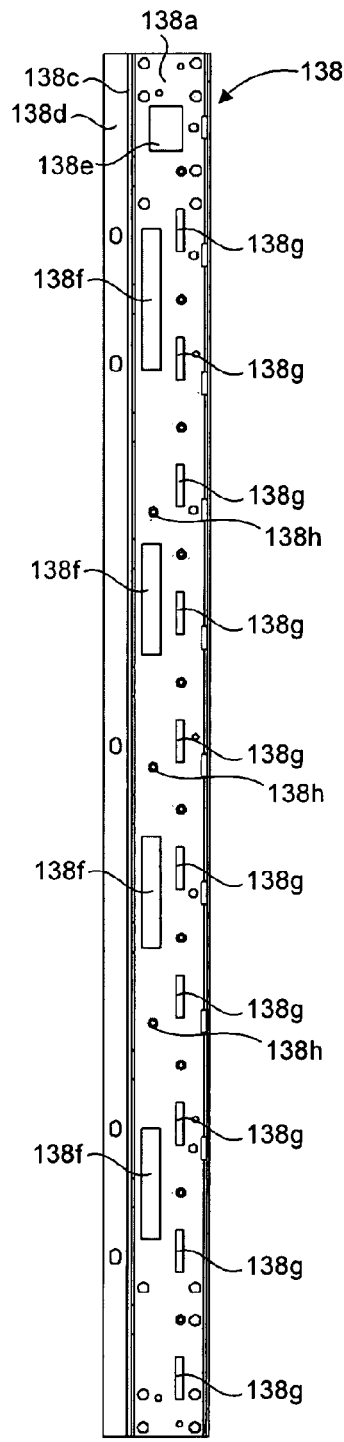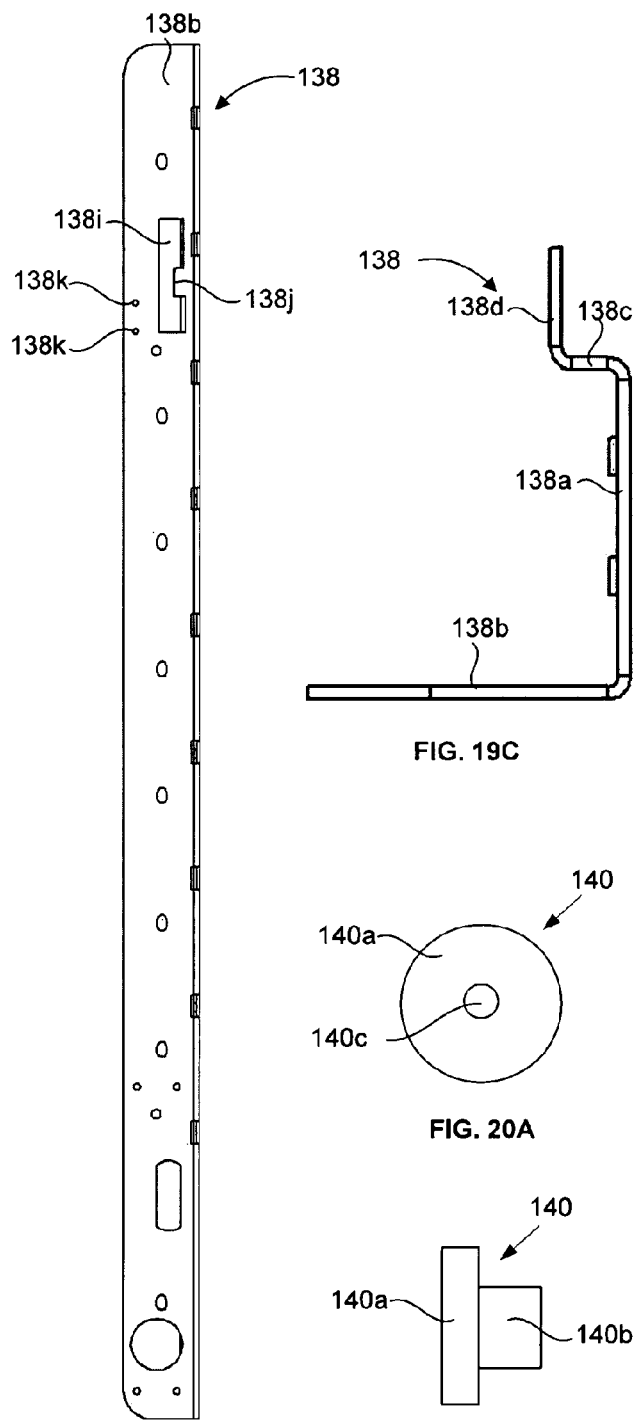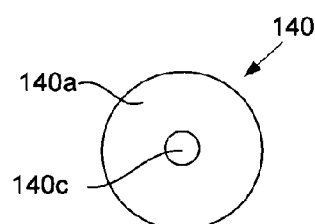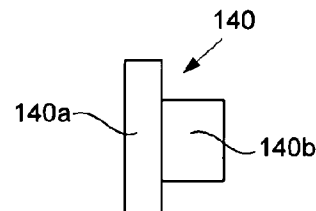
FIG. 19A
FIG. 19B
FIG. 19C
FIG. 20A
FIG. 20B

SEALING STRUCTURE FOR SEALING MULTIPLE SECTIONS AND A DRAWER OF A MEDICAL EMERGENCY CART

BACKGROUND OF THE INVENTION

1. Field of the Invention

The present invention relates to a sealing or locking structure for a mobile utility cart, and more particularly to such a sealing structure for a mobile utility cart commonly called a "medical emergency crash cart" or simply a "crash cart", for medical emergency use in hospitals and other medical institutions. The sealing structure in accordance with an aspect of the present invention enables all storage sections of the crash cart to be locked and sealed, indicating that the crash cart contains a full complement of readily accessible medical equipment, instruments, and supplies. In addition, the locking structure enables an operator of the cart to unlock and unseal a single section of the cart or to unlock and unseal all sections of the cart simultaneously.

For purposes of this application the terms "locked" and "sealed" are used synonymously to mean that the various sections of the cart are held in a closed position or condition until a seal is broken in a way that can be easily confirmed to permit one or more of such sections to be moved to an open position or condition. The term "lock" is not intended to require that any section must be "unlocked" by use of a separate mechanism such as a key.

2. Description of Related Art

A medical emergency crash cart commonly contains medical equipment, instruments, and supplies that may be required while responding to medical emergencies, particularly for medical procedures practiced in cases of cardiac emergencies. However, the crash cart may be equipped for any type of medical emergency. The crash cart generally includes a housing having a plurality of bins, drawers, shelves, sections, and/or compartments for storing medical equipment and supplies such as syringes and drugs.

After all sections of the cart have been fully stocked with equipment, the cart is locked or sealed until the equipment is needed during an emergency. An unbroken tamper-proof seal indicates that the cart is fully stocked. During an emergency, the cart is unlocked or unsealed to enable access to the medical supplies within the cart. After the emergency, the cart typically is sent to a pharmacy department where an inventory of the cart is taken and missing items are replaced. When the cart is restocked, the cart is locked or sealed again until the next emergency.

Current crash carts employ conventional cart locking structures that simultaneously lock or unlock all sections of a cart when actuated. An advantage of such cart locking structures is that the cart can be unlocked quickly. However, if only a single item is needed from one section of the cart, a complete inventory of all sections of the cart must be made after use, which is a very time consuming task. Accordingly, one drawback of current crash carts is that discrete sections cannot be selectively unlocked during an emergency.

U.S. Pat. No. 4,790,610 (Welch et al.), U.S. Pat. No. 5,673,983 (Carlson et al.), and U.S. Pat. No. 6,158,830 (Johnson et al.) disclose mechanisms for locking multiple sections of a cart. A commercial product, known as the Starsys™ Passive Lock Security System, available from InterMetro Industries Corporation, has a number of drawers. In this product, each drawer is provided with a separate breakable or frangible seal such that any one drawer may be opened while the remaining drawers remain closed and sealed. Therefore, it can be confirmed by examination of the seals which have been broken and, therefore, which drawers need to be restocked. However, while the mechanisms disclosed in these patents have many advantages, they are not well suited for selectively unlocking one section of the cart while leaving other sections locked.

For these and other reasons, the crash carts and related locking structures of the prior art are not entirely satisfactory. A need exists for an improved crash cart and related locking structures for providing selective access to multiple sections of the cart.

SUMMARY OF THE INVENTION

It is an object of the present invention to improve the accessibility of medical equipment, instruments, and supplies in a medical emergency crash cart.

It is another object of the present invention to provide a security mechanism that offers easy visual inspection of at least two sections of the crash cart and that assures that a full complement of medical equipment, instruments, and supplies are stored within each section of the crash cart.

Generally speaking, the present invention will be referred to as a "cart," which may incorporate an enclosed cabinet for storing items, such as medical supplies used in responding to medical emergencies. However, the present invention may be used in conjunction with a variety of storage structures, as well as other utility carts that have general application outside of the medical field. Accordingly, the present invention is not limited to crash or other medical carts, but may be used in conjunction with any structure that can benefit from a locking assembly that may be actuated to open a single section of the cart and also can be actuated to open all sections of the cart simultaneously.

The cart in accordance with a preferred embodiment of the present invention includes a housing having a top section and a front section. The top section includes a tub for storing items that are needed most frequently during emergencies. The front section includes one or more bins for storing additional items that may be required during an emergency.

The top section and the front section are secured in a locked condition by a common locking structure that nevertheless permits the top and front sections to be unlocked independently of each other. Therefore, if, for example, in the context of use of the invention as a medical emergency crash cart, only the top section need be unsealed and opened to access those items most frequently needed in an emergency, then the front section may remain closed and sealed. Inventory and restocking of the top section is all that is then required to ready the cart for its next use.

More particularly, a first breakable seal provided at an upper portion of the locking structure can provide quick visual confirmation that, if unbroken, the complements of the top section are complete. A second breakable seal provided at a lower portion of the locking structure can provide quick visual confirmation that, if unbroken, the complements of the front section of the cart are complete. The locking structure is designed to shear the first seal for accessing the contents of the top section quickly. In addition, the locking structure is designed to shear the first and second seals and unlock all sections of the cart for accessing the contents of all sections of the cart quickly.

A more complete appreciation along with an understanding of other objects, features, and aspects of the present invention will become apparent from the following detailed description when considered in conjunction with the accompanying drawings.

Accordingly, in one aspect, the present invention is directed to a cart comprising a housing having a top and at least one side, a recessed tray for storing items provided in the top of the housing, a top cover mountable with the top of the housing for covering the tray to prevent removal of items stored in it, but being removable from or slidable off of the top of the housing thereby to permit access to items stored in the tray, and at least one compartment, also for storing items, associated with and accessible from the one side of the housing. The compartment is movable between (a) a closed position for preventing removal of items stored therein, and (b) an open position to permit access to items stored therein. A seal and lock mechanism are capable of (a) simultaneously locking the top cover to cover the tray and locking the compartment in the closed position, (b) unlocking the cover to permit its removal from the top, but not unlocking the compartment from the closed position, and (c) simultaneously unlocking the top cover to permit its removal from the top and unlocking the compartment permitting it to be moved to the open position.

Accordingly, in another aspect, the present invention is directed to a cart including a housing having a top that defines a recessed tray, a cover for covering the tray but providing access to the interior thereof when removed or otherwise moved away therefrom. The cover includes a first cover retaining portion having a lock seal aperture formed therethrough. At least one compartment is mounted on one side of said housing and being movable between an open position providing access to its interior and a closed position with its interior enclosed. A lock can lock the compartment in the closed position, the lock includes a stationary member and a slide member having a lock seal aperture formed therethrough. The slide member is movable to (a) a first position where the lock seal aperture of the slide member is aligned with the lock seal aperture of the first cover retaining portion and where the compartment is locked in the closed position, and (b) a second position where the lock seal aperture of the slide member is not aligned with said lock seal aperture of said first cover retaining portion and where the compartment is not locked in the closed position.

BRIEF DESCRIPTION OF THE DRAWINGS

FIGS. 7A and 7B are top and front views, respectively, of a sliding top cover retainer bar illustrated in FIG. 1C.

FIGS. 8A and 8B are top views of a lock seal illustrated in FIG. 1C, shown in an unsealed state and a sealed state, respectively.

FIGS. 10A and 10B are front and right side views, respectively, of a front frame illustrated in FIG. 1A.

FIGS. 12A and 12B are right side and top views, respectively, of a tilt-out bin illustrated in FIG. 1B.

FIGS. 14A, 14B, and 14C are front, right side, and top views, respectively, of a manual lock handle of the present invention.

FIGS. 15A, 15B, and 15C are right side, top, and bottom views, respectively, of a thumb latch of the present invention.

FIG. 16 illustrates attachment of the manual lock handle illustrated in FIGS. 14A through 14C to the lock bar illustrated in FIGS. 9A and 9B.

FIGS. 18A, 18B, and 18C are front, right side, and top views, respectively, of a manual lock bracket of the present invention.

FIGS. 19A, 19B, and 19C are front, right side, and top views, respectively, of a vertical channel of the present invention.

FIGS. 20A and 20B illustrates right side and front views, respectively, of a bushing used to slidably attach the lock bar illustrated in FIGS. 9A and 9B to the vertical channel illustrated in FIGS. 19A, 19B, and 19C.

DETAILED DESCRIPTION OF THE INVENTION

Initially, the principal features of the present invention will be described generally in order to provide an overview of its various aspects. Then those features will be described in detail.

FIGS. 1A through 1E illustrate a front view, a side view, a top view, a perspective view taken from the front right, and a partial top view, respectively, of external and internal features of one embodiment of a crash cart 100 according to the present invention. More particularly, FIGS. 1A through 1E show the cart 100 with certain external enclosures removed so that internal operating mechanisms can be illustrated. In addition, while the present invention is described in the environment of a cart, structures for mounting the cart for movement on a floor, for example, like wheels or casters have been omitted. The unshown features are well within the skill of the art and are not part of the present invention.

Figure 1A:
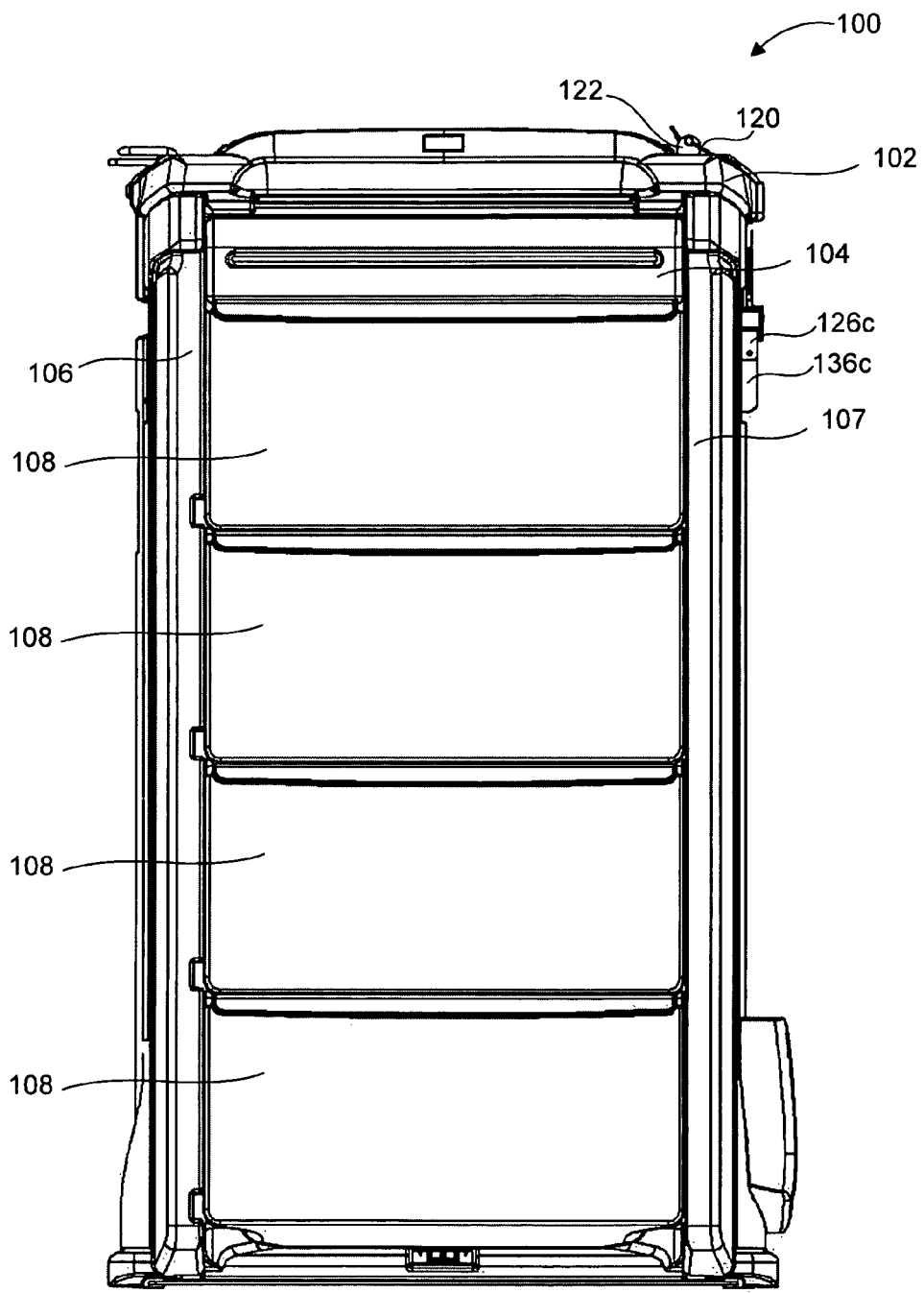
FIGS. 1A, 1B, 1C, 1D, 1E, and 1F are a front view, a right side view, a top view, a perspective view taken from the front right, a partial top view, and a partial cross-sectional view taken along line 1F-1F in FIG. 1C and looking in the direction of the arrows, respectively, of certain external and internal features of a preferred embodiment of a crash cart in accordance with the present invention.

As shown in FIG. 1A, the crash cart 100 in accordance with the invention includes a top frame 102, a front frame 104, a left front frame 106, and a right front frame 107. The left front frame 106 and the right front frame 107 support four substantially identical tilt-out bins 108, in which medical supplies may be stored.

Figure 2A:
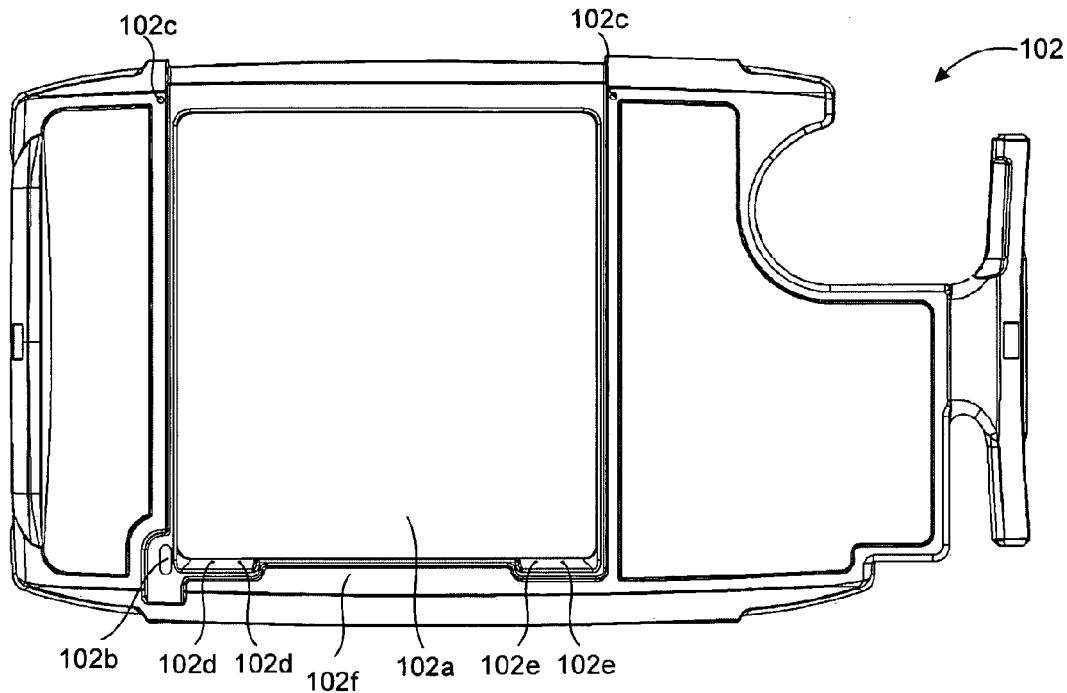
FIGS. 2A and 2B are top and bottom views, respectively, of a top frame or component illustrated in FIGS. 1A through 1D.
Figure 2B:
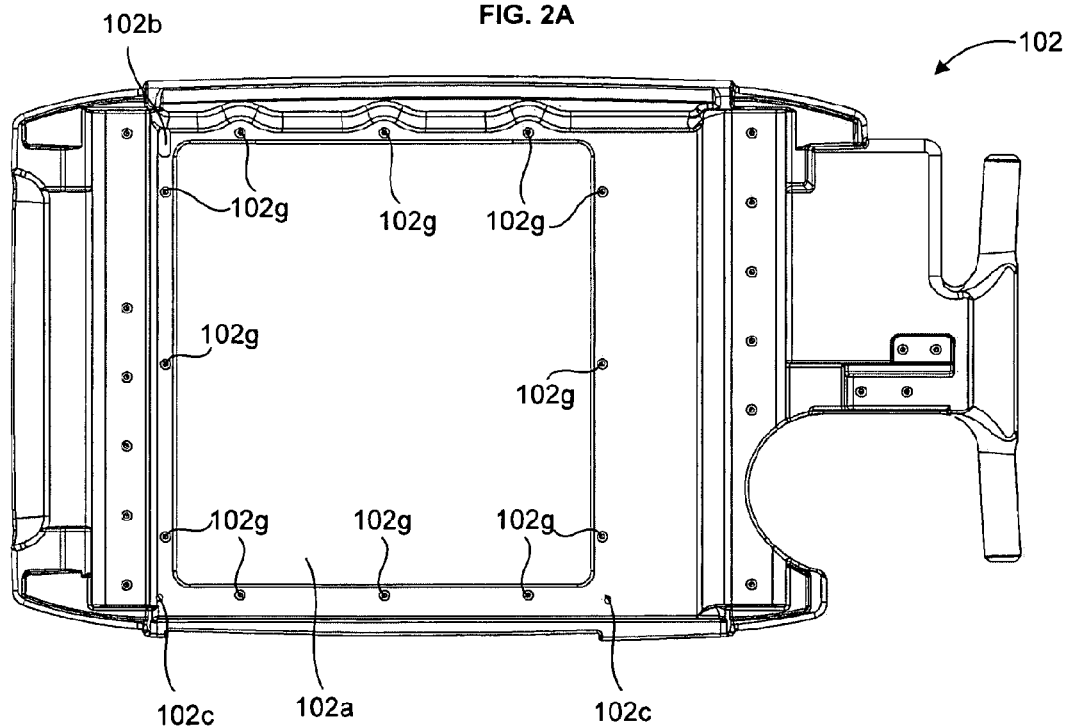

FIGS. 2A and 2B illustrate top and bottom views, respectively, of the top frame or component, which may be a molded part, 102 of the cart 100. An upper portion of the top frame 102 includes a tub opening 102a, a lock bar opening 102b, sliding top cover retainer bar openings 102c, screw openings 102d, screw openings 102e, and a flange 102f, as shown in FIG. 2A. A lower portion of the top frame 102 also can be considered to be formed with the tub opening 102a, the lock bar opening 102b, and screw openings 102g, as shown in FIG. 2B.

Figure 3A:
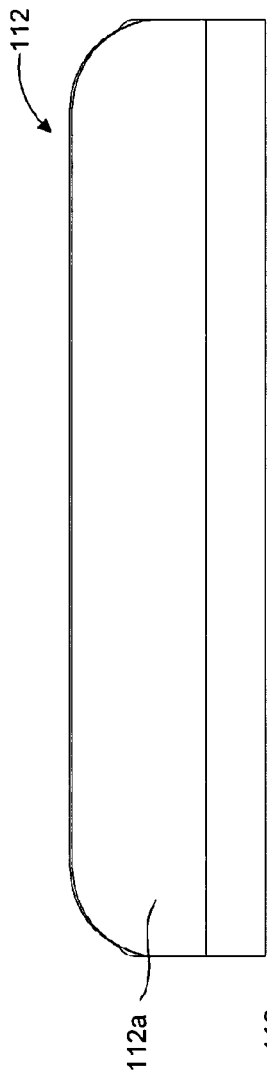
FIGS. 3A, 3B, and 3C are front, top, and right side views, respectively, of a top cover hold-down bracket of the present invention.
Figure 3B:
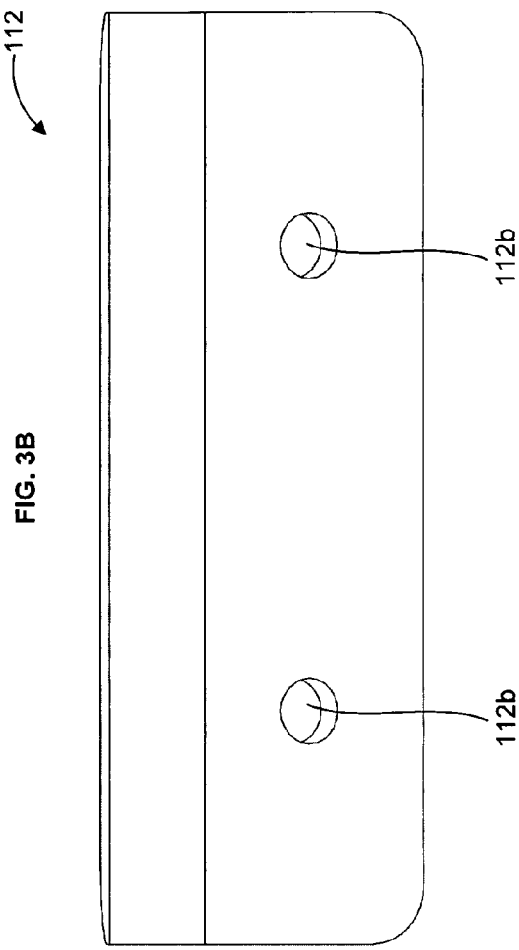
Figure 3C:
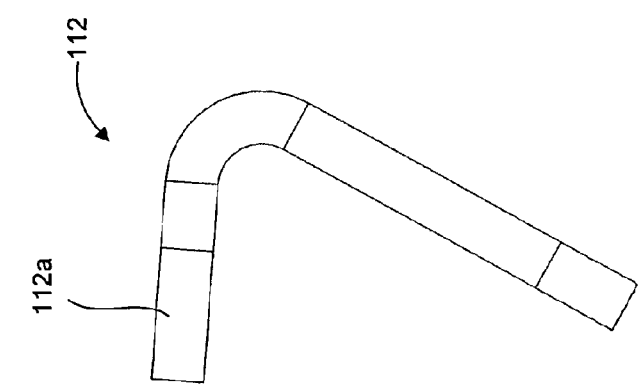

A sliding top cover 110 is removably attached to the top frame 102 to enclose a tub that is described below. Attachment of the sliding top cover 110 to the top frame 102 is described with reference to FIGS. 1C and 2 through 10. More particularly, a top cover hold-down bracket 112 is illustrated in FIGS. 3A through 3C. The top cover hold-down bracket 112 includes a retaining flange 112a and screw apertures 112b. A first top cover hold-down bracket 112 is attached to the top frame 102 using a pair of screws (not illustrated) that are inserted through the screw apertures 112b of the top cover hold-down bracket 112 and advanced into the screw openings 102d of the top frame 102. A second top cover hold-down bracket 112 is similarly attached to the top frame 102 using a pair of screws (not illustrated) that are inserted through the screw apertures 112b of the top cover hold-down bracket 112 and advanced into the screw openings 102e of the top frame 102.

Figure 4A:
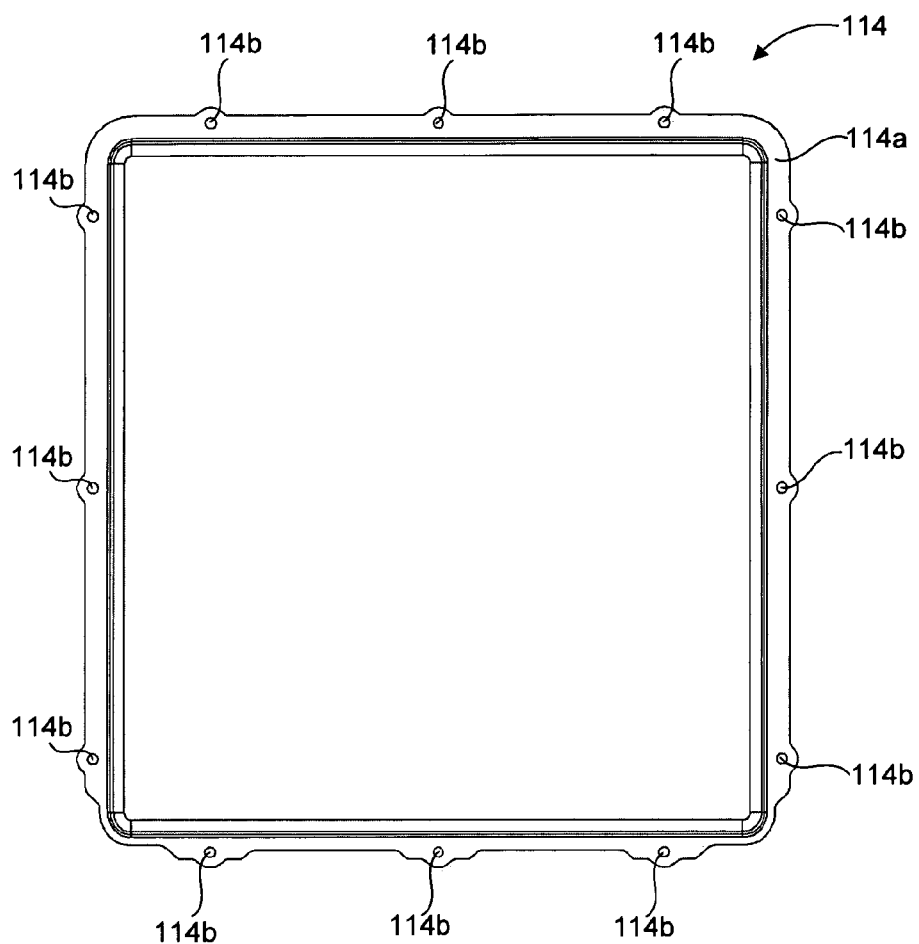
FIGS. 4A and 4B are top and right side views, respectively, of a tub illustrated in FIG. 1B.
Figure 4B:
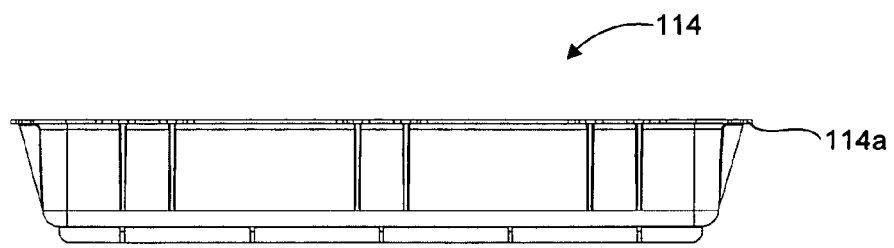

FIGS. 4A and 4B illustrate top and side views, respectively, of the tub 114. A flange 114a is disposed about an upper periphery of the tub 114. A plurality of screw apertures 114b are formed through the flange 114a. The tub 114 is attached to the top frame 102 using a plurality of screws (not illustrated) that are inserted through the screw apertures 114b of the flange 114a and advanced into the screw openings 102g of the top frame 102. The tub 114 may be used to store medical items that are required most often during emergencies.

Figure 1B:
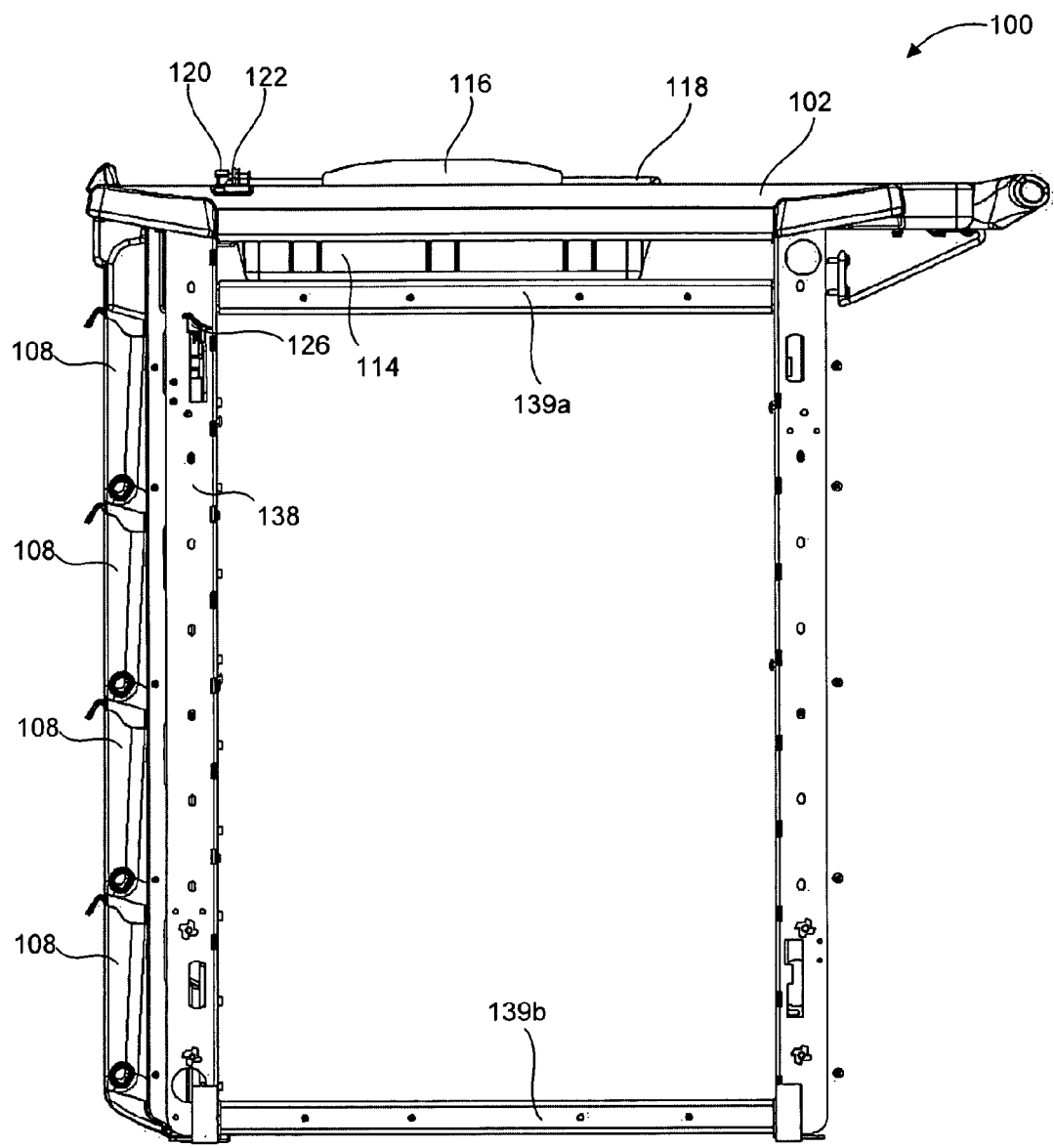
Figure 1C:
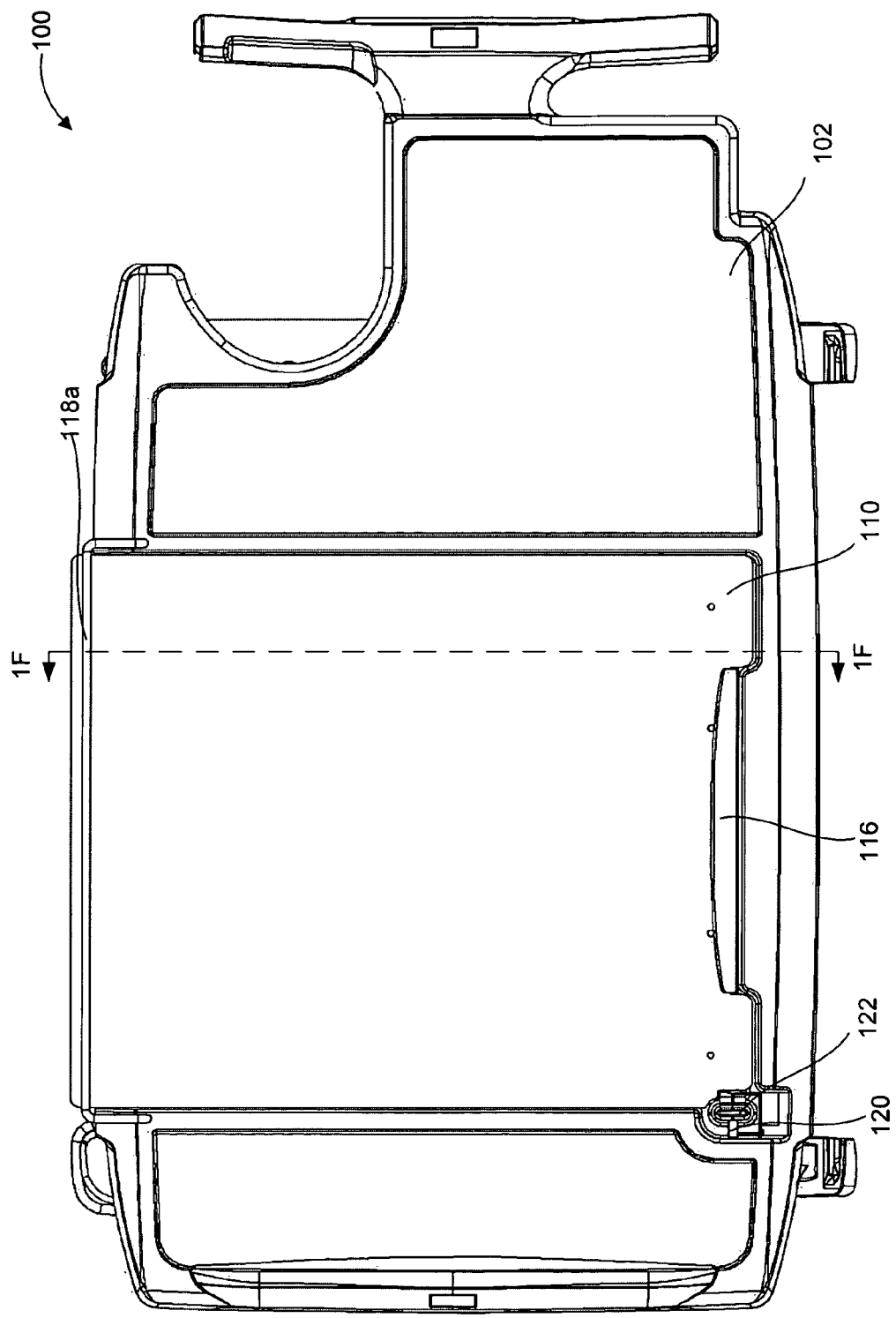
Figure 1D:
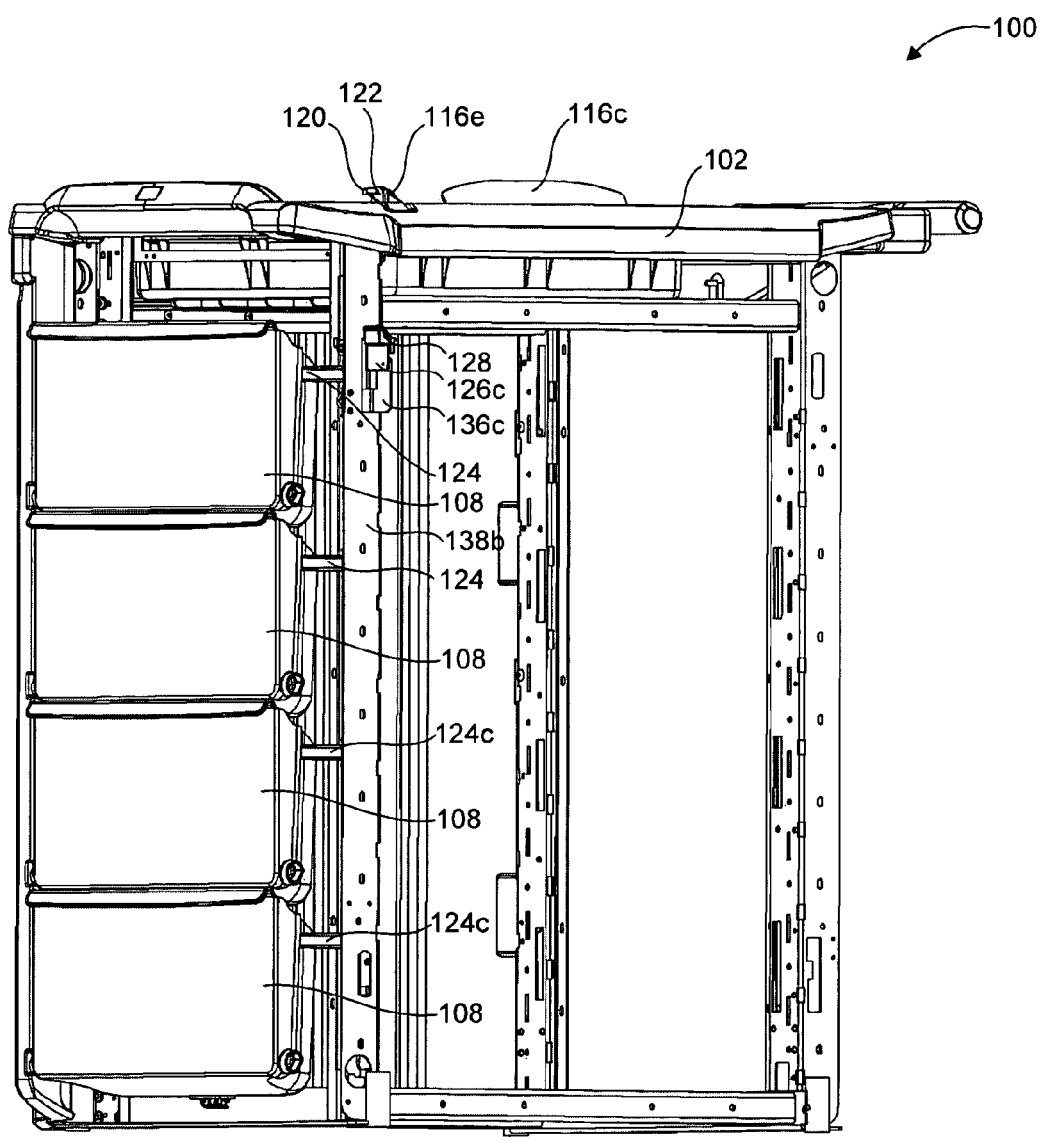
Figure 1E:
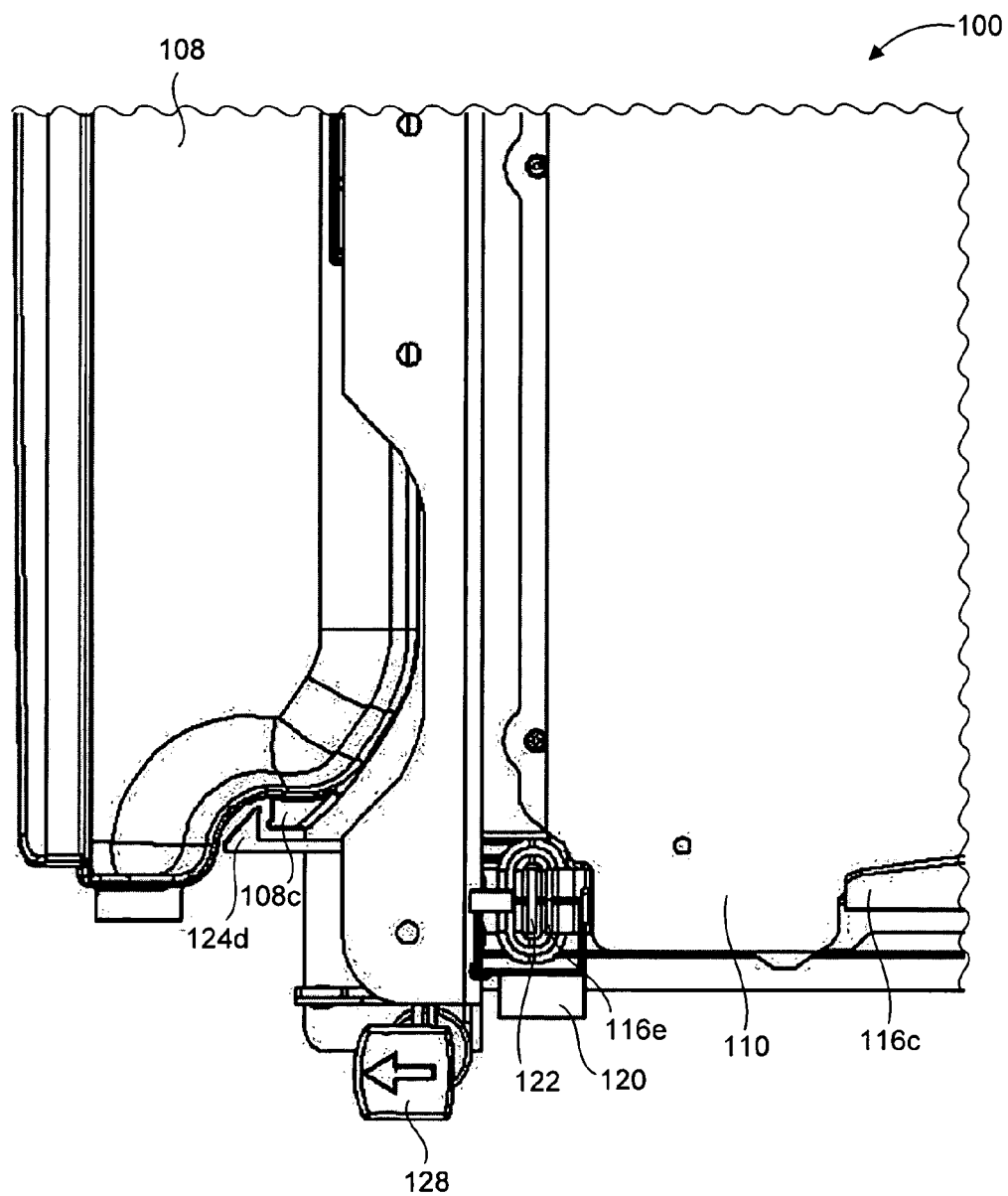
Figure 5:
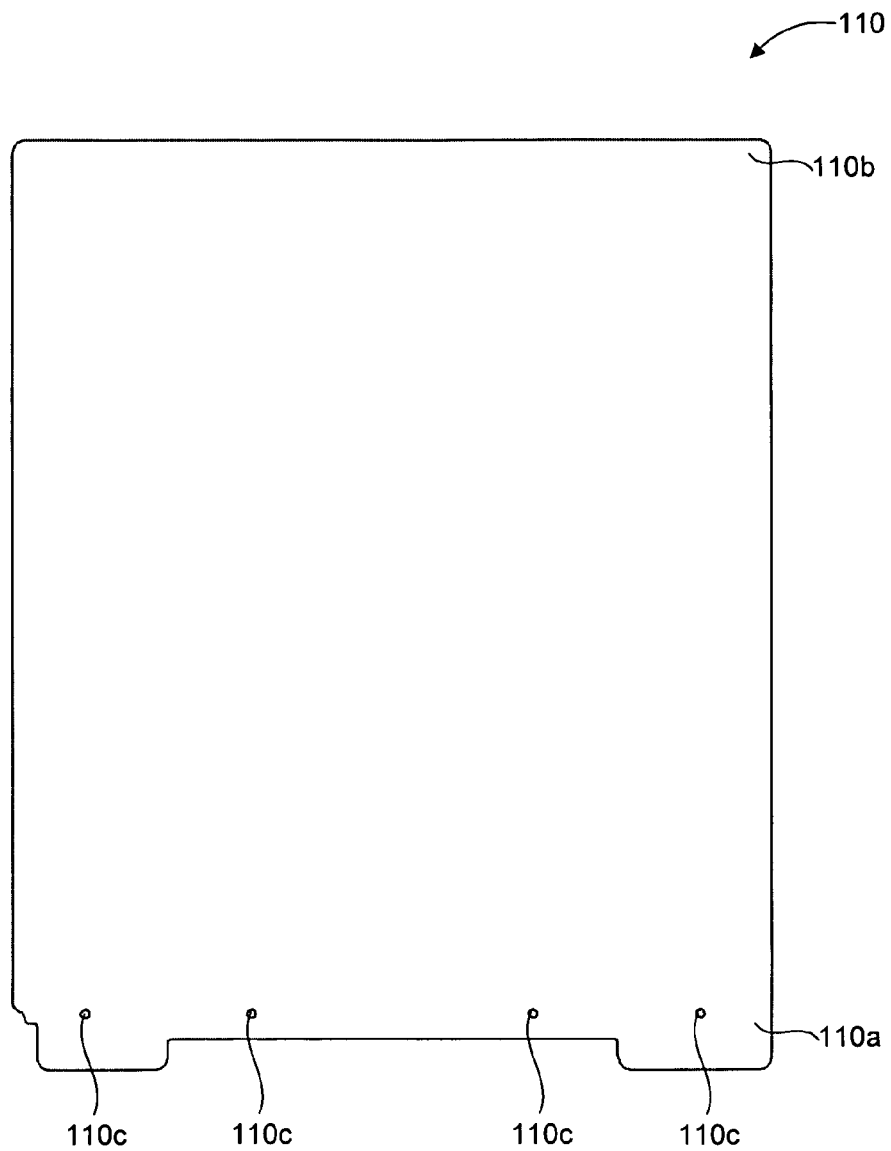
FIG. 5 is top view of a sliding top cover illustrated in FIG. 1C.

As shown in FIG. 1C, the sliding top cover 110 is disposed over the tub 114 when an upper section of the cart 100 is locked, thereby preventing access to the tub 114. When the upper section of the cart 100 is unlocked, the sliding top cover 110 may be removed to provide access to items stored in the tub 114. The sliding top cover 110 includes a first end 110a, an opposing second end 110b, and four rivet apertures 110c formed through the first end 110a, as shown in FIG. 5.

Figure 6A:
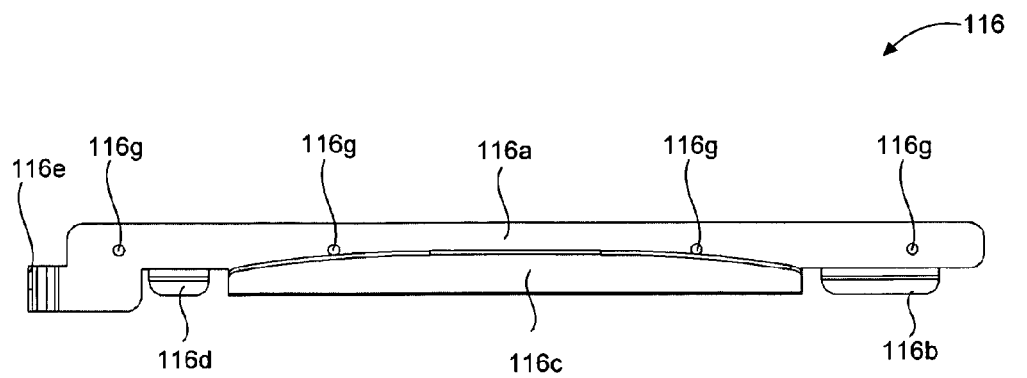
FIGS. 6A, 6B, and 6C are top, right side, and front views, respectively, of a sliding top cover pull plate illustrated in FIG. 1C.
Figure 6B:
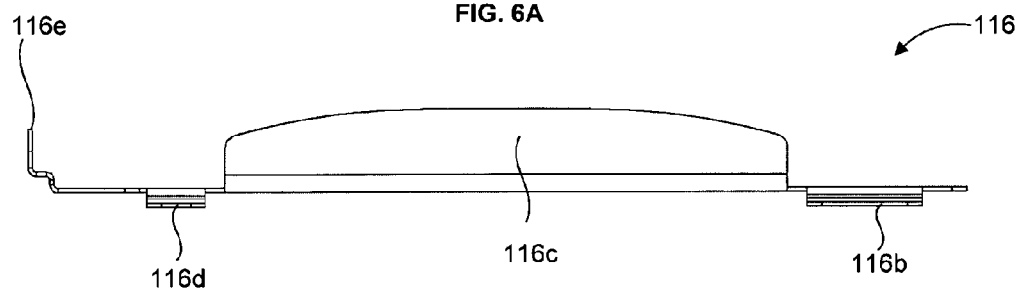
Figure 6C:
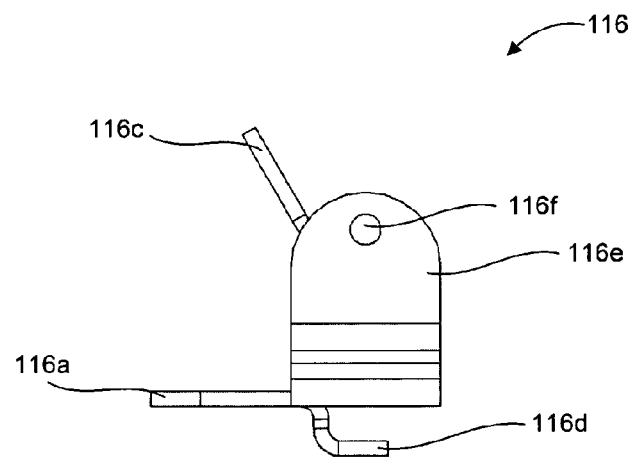

FIGS. 6A, 6B, and 6C illustrate top, side, and front views, respectively, of a sliding top cover pull plate 116, with which the sliding top cover 110 is equipped and which includes a main portion 116a, a first retaining flange 116b, a handle portion 116c, a second retaining flange 116d, and a locking flange 116e, which includes a lock seal aperture 116f formed therethrough. A plurality of rivet apertures 116g are formed through the main portion 116a of the sliding top cover pull plate 116.

The sliding top cover pull plate 116 is fixed to the sliding top cover 110 using a plurality of rivets (not illustrated) that are inserted through the rivet apertures 110c of the sliding top cover 110 and the rivet apertures 116g of the sliding top cover pull plate 116. A plurality of nuts (not illustrated) are attached to the plurality of bolts to securely attach the sliding top cover pull plate 116 to the sliding top cover 110. Of course, any suitable fasteners such as bolts, rivets, screws, and the like may be used in the various applications.

FIGS. 7A and 7B illustrate top and front views, respectively, of a sliding top cover retainer bar 118, with which the top cover is also equipped and which includes a top cover retaining portion 118a, horizontal extension portions 118b, and vertical extension portions 118c. Push fasteners or push nuts are secured to lower portions of the vertical extension portions 118c, which are inserted into the openings 102c of the top frame 102 thereby securely attaching the sliding top cover retainer bar 118 to the top frame 102.

FIGS. 8A and 8B illustrate a lock seal 120 in an unsealed state and in a sealed state, respectively, for sealing and locking the sliding top cover 110 in place. The lock seal 120, which is known, per se, and commercially available, includes a severable or frangible locking portion 120a, which has a first end 120b, and a retaining portion 120c. As shown in FIG. 8A, when the lock seal 120 is not sealed, the locking portion 120a is not connected to the retaining portion 120c. As shown in FIG. 8B, when the lock seal 120 is sealed, the locking portion 120a is fixed to the retaining portion 120c. The seal 120 may also include a depending tab 120d on which a serial number may be printed or embossed. The serial numbers may be used by, for example, hospital staff to monitor how many times portions of the cart have been accessed in order to track carefully items or supplies used from the cart.

Figure 9A:
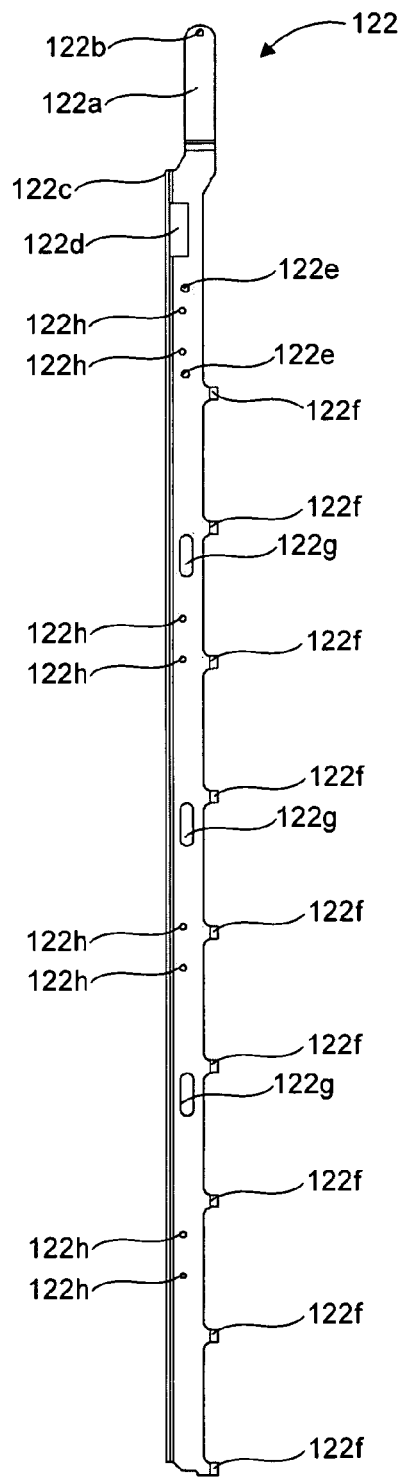
FIGS. 9A and 9B are front and right side views, respectively, of a lock bar of the present invention.
Figure 9B:
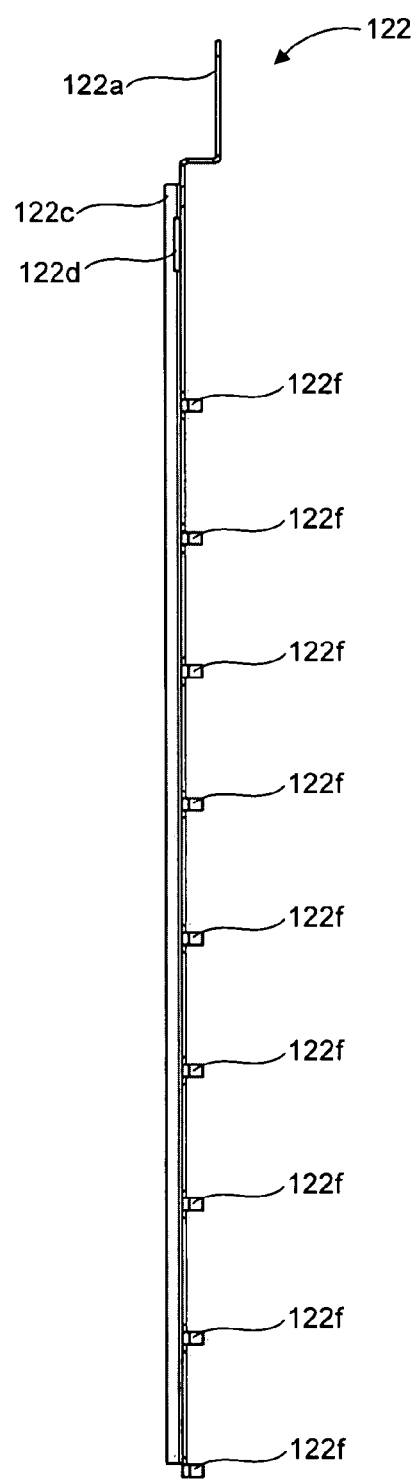

FIGS. 9A and 9B illustrate front and side views, respectively, of a lock bar 122. The lock bar 122 includes a main portion 122a, a lock seal aperture 122b, a sliding flange 122c, a rectangular aperture 122d, screw apertures 122e, retaining flanges 122f, oval-shaped apertures 122g, and screw apertures 122h. The interengagement and interaction of these components will now be described further below as a first storage section of the crash cart.

First Storage Section of Crash Cart

Figure 1F:
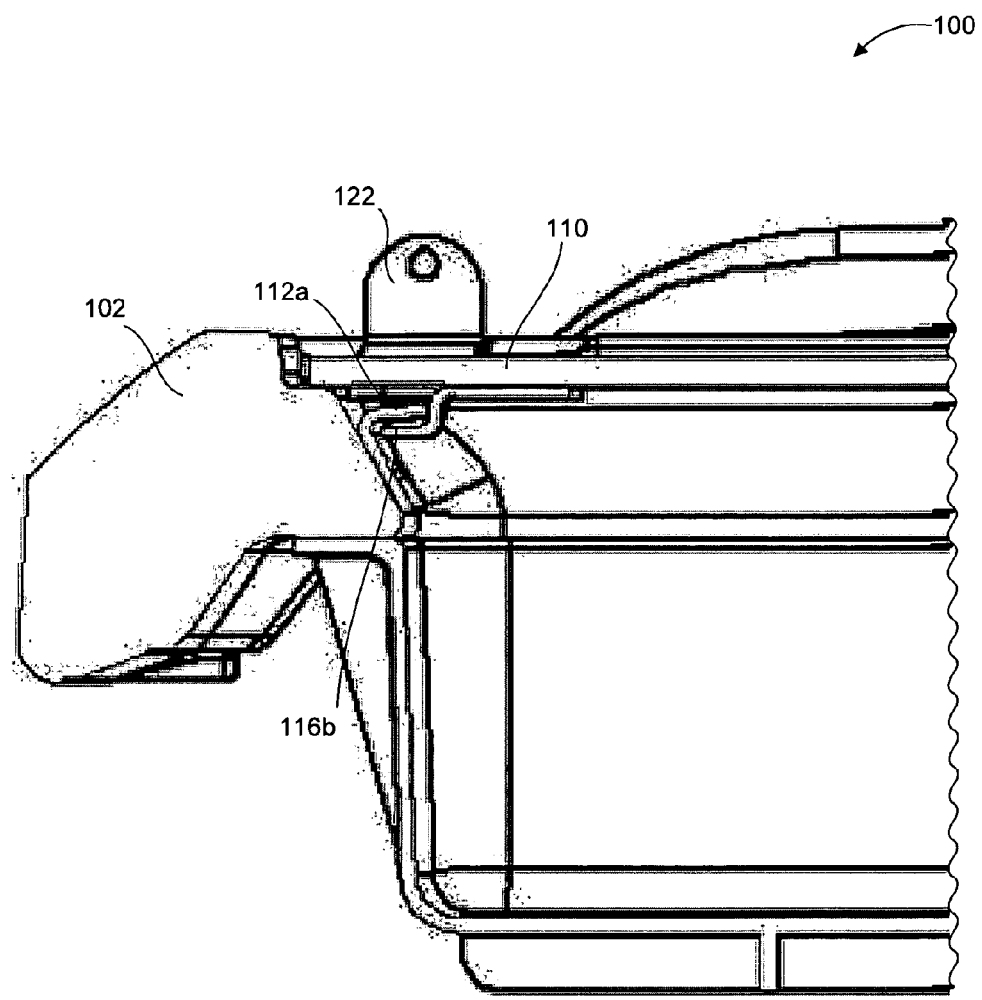

The first storage section of the cart 100 may be defined by the top frame 102, the tub 114, and the sliding top cover 110. To secure the first storage section in a closed and locked state, the second end 110b of the top cover 110 is inserted between the retaining portion 118a of the top cover retainer bar 118 and the top frame 102, as shown in FIG. 1C. The first end 110a of the top cover 110 then is positioned so that the first retaining flange 116b and the second retaining flange 116d of the top cover pull plate 116 are disposed beneath the retaining flanges 112a of the cover hold-down brackets 112, which prevent the first end 110a of the top cover 110 from being lifted upwardly, as shown in FIG. 1F.

When the top cover 110 is positioned as shown in FIG. 1C, the lock seal aperture 116f of the locking flange 116e of the pull plate 116 (shown in FIG. 6C) is aligned with the lock seal aperture 122b of the lock bar 122 (shown in FIG. 9A). The first section may be locked or sealed by inserting a first end 120b of a locking portion 120a of a lock seal 120 through the lock seal apertures 116f and 122b and into the retaining portion 120c of the lock seal 120.

During an emergency, an operator may remove the sliding top cover 110 from covering the top of the cart 100 by pushing the handle portion 116c of the cover pull plate 116 toward the cover retainer bar 118, which causes the lock bar 122 and the locking flange 116e of the cover pull plate 116 to sever the locking portion 120a of the lock seal 120. When the handle portion 116c engages the cover retainer bar 118, the top cover 110 may tilt downwardly and hang from the side of the cart. Further, once the locking portion 120a of the lock seal 120 is broken, an operator is then able to slide the first end 110a of the top cover 110 toward the sliding top cover retainer bar 118 until the first retaining flange 116b and the second retaining flange 116d of the pull plate 116 are no longer disposed beneath the retaining flanges 112a of the hold-down brackets 112. The operator can then lift the sliding top cover 110 upwardly and remove it.

After the emergency, the cart 100 may be sent to the pharmacy department for taking of inventory and restocking. If the operator recloses or replaces the sliding top cover 110 prior to returning the cart 100 to the pharmacy department, the lock seal 120 will no longer be within the lock seal apertures 116f and 122b, which indicates that the first section must be checked for its inventory, restocked, and resealed with a new lock seal 120 prior to returning the cart 100.

A second storage section of the cart will now be described.

Second Storage Section of Crash Cart

A second storage section of the cart 100 is defined by the front frame 104, the left front frame 106, the right front frame 107, and the tilt-out bins 108. FIGS. 10A and 10B illustrate front and side views, respectively, of the front frame 104. The front frame 104 includes side walls 104a, which have rectangular apertures 104b formed therethrough. Circular indentations 104c are formed in inner surfaces of the side walls 104a.

Figure 11A:
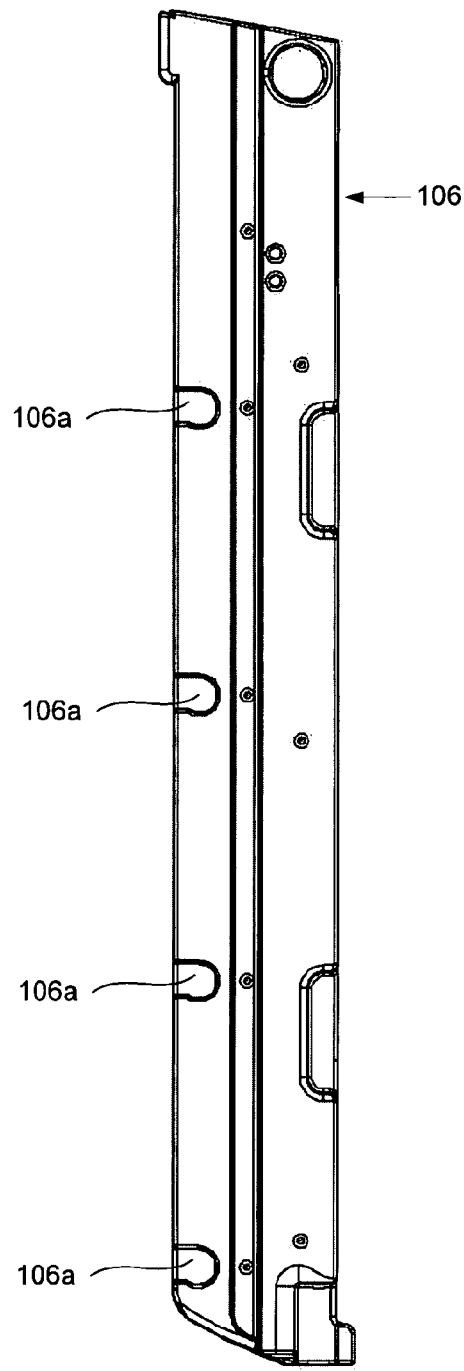
FIG. 11A is a right side view of a left front frame.
Figure 11B:
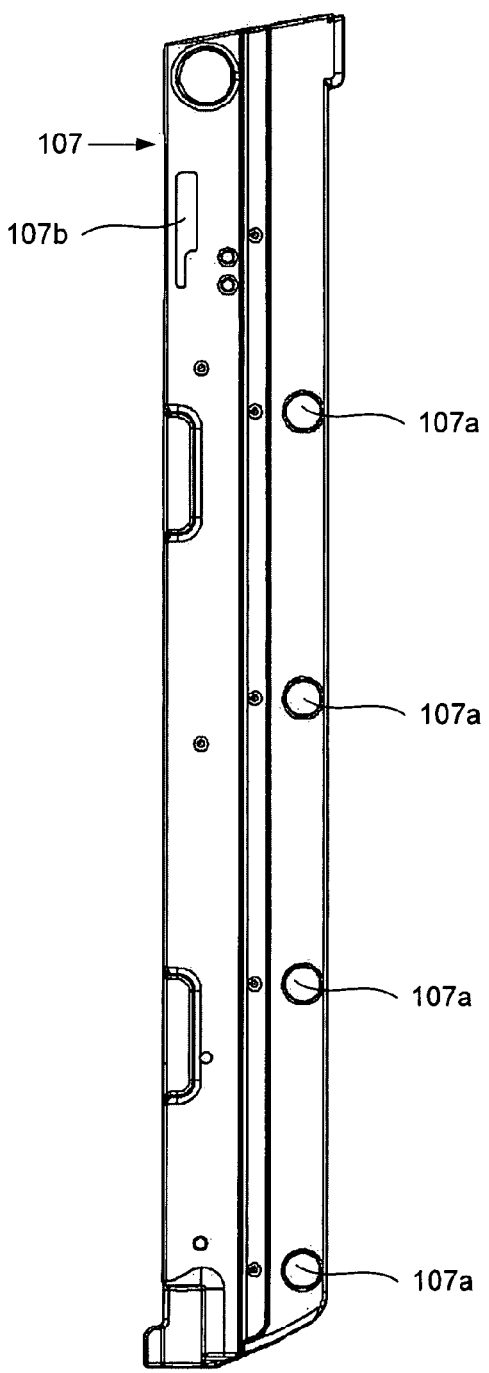
FIG. 11B is a left side view of a right front frame of the present invention.

FIG. 11A is a right side view of the left front frame 106. The left front frame 106 includes recesses 106a. FIG. 11B is a left side view of the right front frame 107. The right front frame 107 similarly includes recesses 107a and a lock aperture 107b.

FIGS. 12A and 12B illustrate side and top views, respectively, of one tilt-out bin 108. The bin 108 includes a handle 108a, partially cylindrical projections 108b, and locking tabs 108c. Each locking tab 108c includes a lip 108d formed at an outer, forward surface thereof.

Each tilt-out bin 108 is mounted into the front of the cart 100. Opposed projections 108b of the tilt-out bins 108 are received in the recesses 106a and 107a of the left front frame 106 and the right front frame 107, respectively. Accordingly, the projections 108b act as pivots for tilting the tilt-out bins 108 with respect to the front frame 104.

Figure 13A:
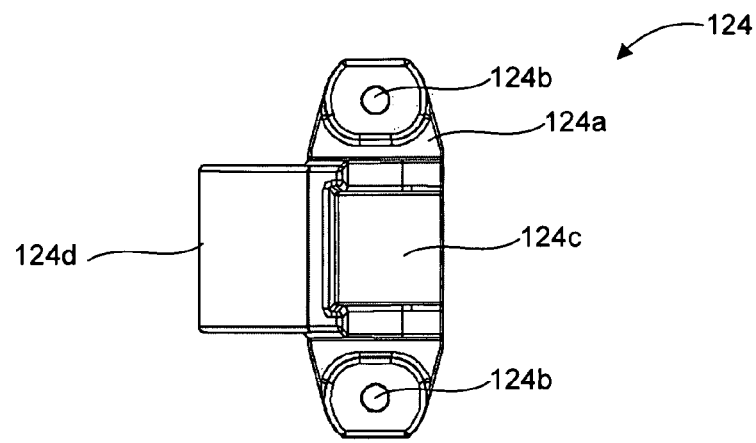
FIGS. 13A, 13B, and 13C are front, right side, and top views, respectively, of a tilt-out bin lock bar clip of the present invention.
Figure 13B:
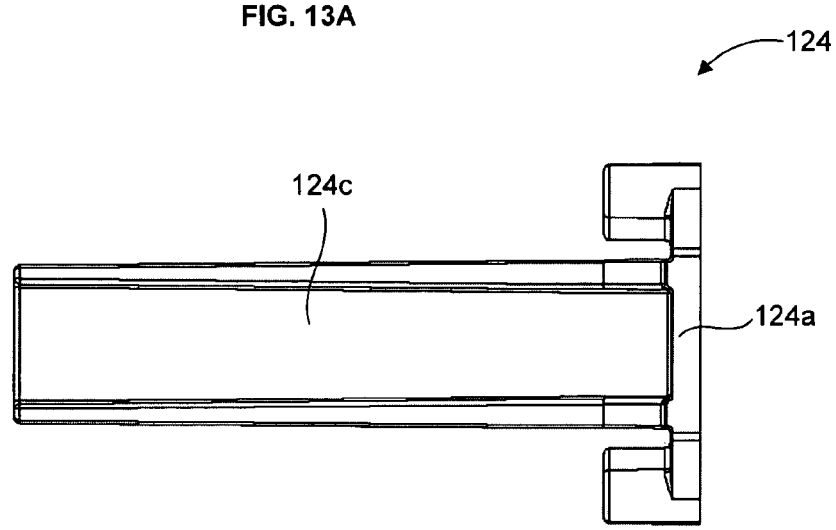
Figure 13C:
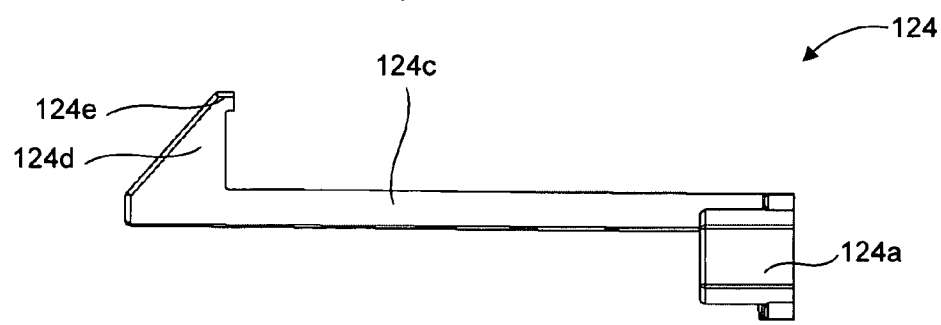

FIGS. 13A, 13B, and 13C illustrate front, side, and top views, respectively, of a tilt-out bin lock bar clip 124. The bin lock bar clip 124 includes a base portion 124a, which has a pair of screw apertures 124b formed therethrough. The bin lock bar clip 124 also includes an extension member 124c that extends from the base portion 124a. A locking tab 124d is formed at the forward end of the extension member 124c. The locking tab 124d includes a lip 124e formed at an inner surface thereof. The lips 124e of the bin lock bar clips 124 cooperate with the lips 108d of the locking tabs 108c of the bins 108 to securely lock them in a closed position.

Four tilt-out bin lock bar clips 124 are securely attached to the lock bar 122 illustrated in FIGS. 9A and 9B. More particularly, each lock bar clip 124 is secured to the lock bar 122 using a pair of screws (not illustrated) that are inserted through the screw apertures 122h (shown in FIG. 9A) of the lock bar 122 and advanced into the screw apertures 124b of the tilt-out bin lock bar clips 124.

A third storage section of the cart will now be described.

Third Storage Section of Crash Cart

Figure 22A:
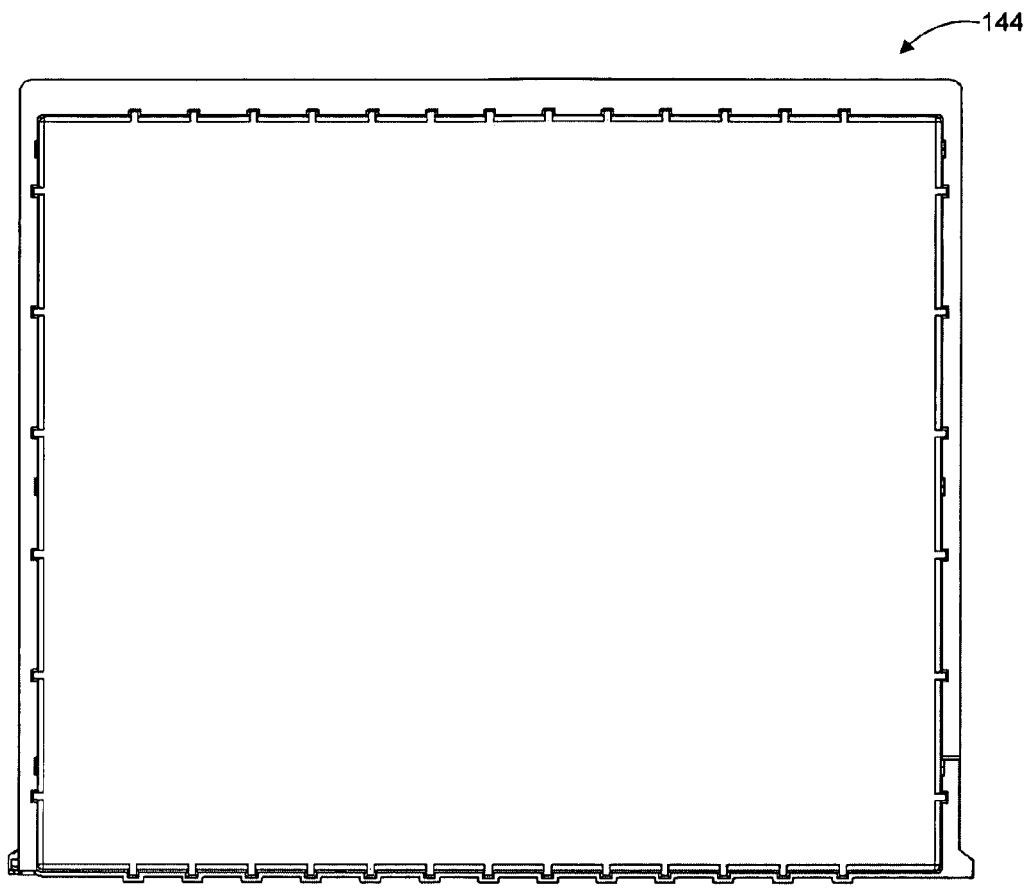
FIGS. 22A and 22B illustrate top and front views, respectively, of a drawer of the present invention.
Figure 22B:
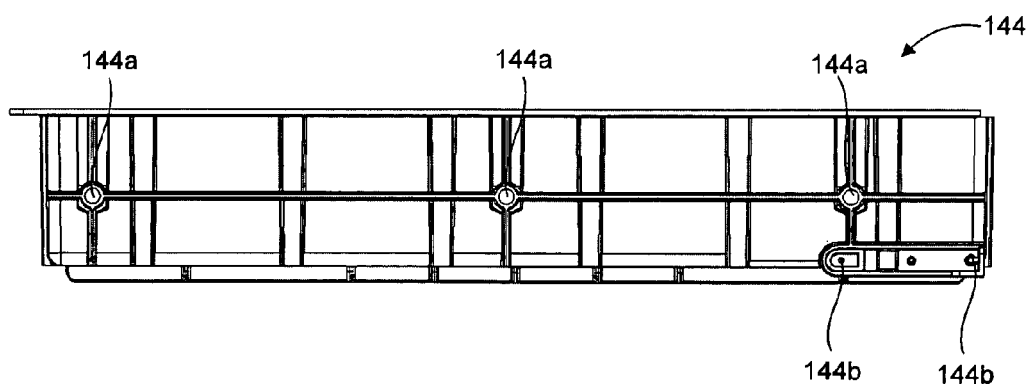
Figure 24:
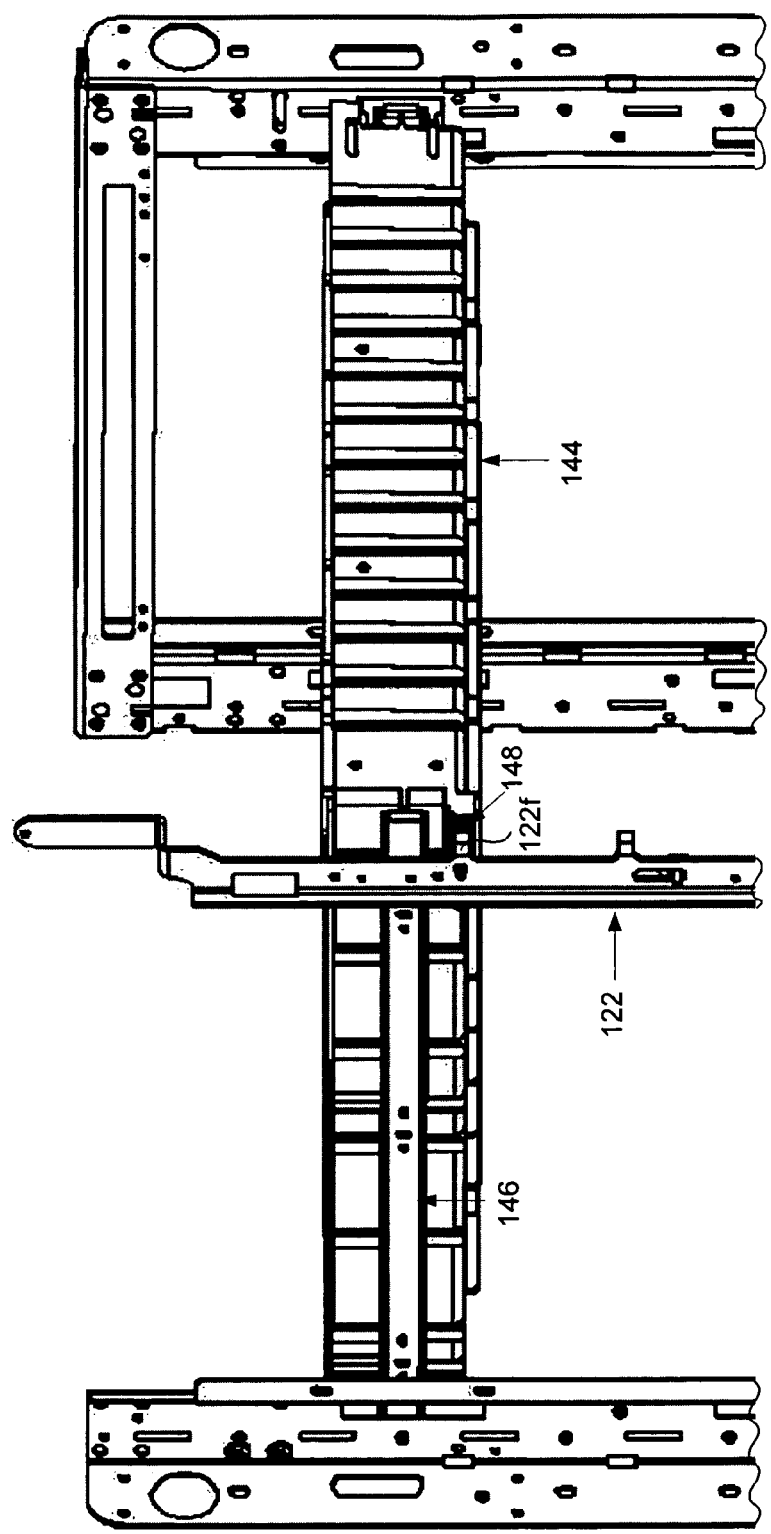
FIG. 24 illustrates a partial three-quarter perspective view, taken from the front and right side of the cart shown in FIGS. 1A through 1F with sections removed to show certain external and internal features.

The third storage section of the cart 100 is defined by the top frame 102 and one or more drawers 144 that are slidably mounted in the cart 100. FIGS. 22A and 22B illustrate top and front views, respectively, of a drawer 144 in which medical supplies may be stored. A front wall of the drawer 144 includes a plurality of bolt apertures 144a formed therethrough. A back wall (not shown) of the drawer 144 also includes a plurality of bolt apertures 144a formed therethrough. The bolt apertures 144a are used to attach slide rails 146 (one of which is shown in FIG. 24) using a plurality of nuts and bolts (not shown). The front wall of the drawer 144 includes a pair of screw apertures 144b.

Figure 23A:
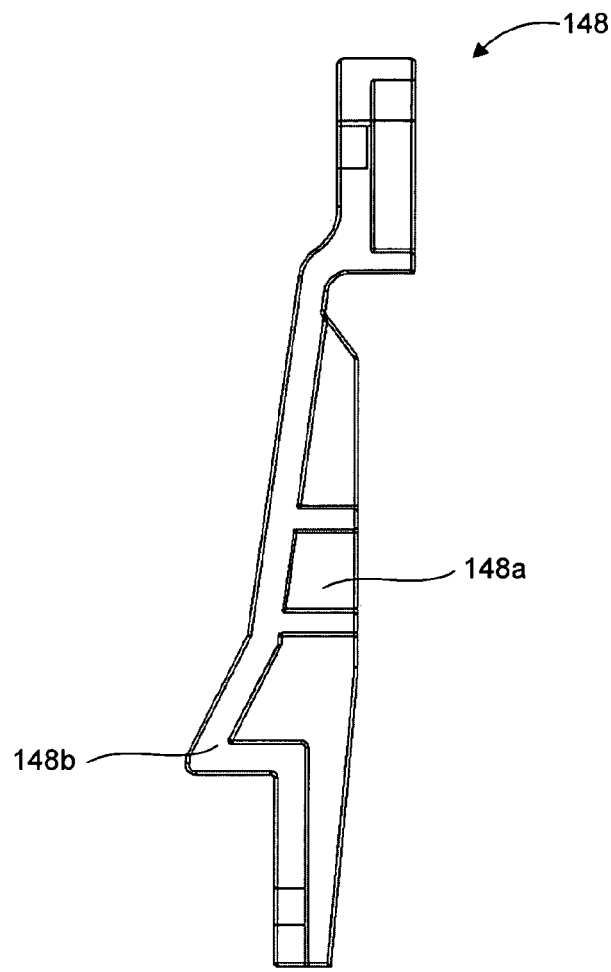
FIGS. 23A and 23B illustrate top and front views, respectively, of a drawer lock tab of the present invention.
Figure 23B:
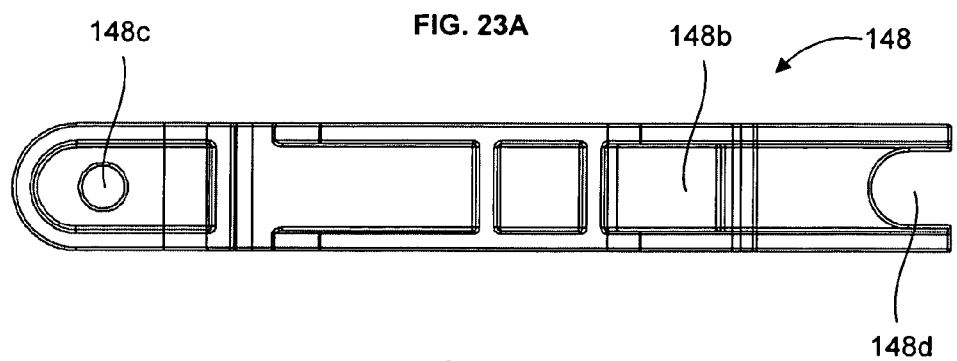

FIGS. 23A and 23B illustrate top and front views, respectively, of a drawer lock tab 148. The drawer lock tab 148 includes a main portion 148a, and a notch 148b that extends from the main portion 148a. The drawer lock tab 148 also includes apertures 148b and 148c, which are used to secure the drawer lock tab 148 to the drawer 144. More particularly, a screw (not shown) is inserted through each of the apertures 148b and 148c of the drawer lock tab 148, and advanced into corresponding screw apertures 144b of the drawer 144. The screw (not shown) that is inserted into 148d of the drawer lock tab 148 prevents the drawer lock tab 148 from flexing away from the drawer 144, which prevents the drawer lock tab 148 from becoming caught on the frame of the cart 100 as the drawer 144 is opened and closed. It will also be appreciated that the tab 148 can flex inwardly when the drawer is closed permitting it to be overridden by a retaining flange 122f, as described below.

FIG. 24 illustrates a partial three-quarter view of the cart 100 taken from the front and right side, with a drawer 144 slidably attached thereto. The drawer 144 is accessible from the right side of the cart 100. An operator may pull on a handle (not shown) attached to the drawer 144, which causes the slide rail 146 and an opposing slide 146 rail (not shown) mounted to a back wall of the drawer 144 to slide within slide members (not shown) that are attached to the cart 100 and receive the slide rails 146. The lock bar 122 is shown in a locked position. In the locked position, one of the retaining flanges 122f of the lock bar 122 is disposed directly in front of the notch 148b of the drawer lock tab 148, which prevents the drawer 144 from being moved to the open position. Although not shown in FIG. 24, multiple drawers 144 may be slidably mounted within the cart 100. When the drawers 144 are closed and the lock bar 122 is moved to the locked position, each of the retaining flanges 122f of the lock bar 122 is disposed in front of one of the notches 148b of the drawer lock tabs 148, which prevents all of the drawers 144 from being opened until the lock bar 122 is moved to an open position. It is noted that the shape of the notch 148b of the drawer lock tab 148 enables the drawers 144 to be closed, even when the lock bar 122 previously has been moved to the locked position.

Assembly of the sealing mechanism of the present invention will now be described.

FIGS. 14A, 14B, and 14C illustrate front, side, and top views, respectively, of a manual lock handle 126, which includes a base portion 126a, having a pair of standoff apertures 126b formed therethrough. A locking portion 126c extends from the base portion 126a and includes a lock seal aperture 126e formed therethrough. A latch flange 126d extends from the locking portion 126c and includes a screw aperture 126f formed therethrough.

The manual lock handle 126 is pivotably attached to the lock bar 122. Attachment of the manual lock handle 126 to the lock bar 122 is described with reference to FIG. 16. More specifically, a hex head standoff 130 includes a cylindrical shaft 130a and a hexagonally shaped end portion 130b. The cylindrical shaft 130a is inserted into an aperture of a washer 132 and a center portion of a spring 134 and is advanced until the washer 132 contacts the spring 134 and the end portion 130b contacts the washer 132. The standoff apertures 126b of the base portion 126a of the lock handle 126 then are aligned with screw apertures 122e of the lock bar 122. A screw 135 is inserted through one of the screw apertures 122e of the lock bar 122 and a corresponding standoff aperture 126b of the base portion 126a of the manual lock handle 126, and is advanced into the center of the cylindrical shaft 130a of the hex head standoff 130. This procedure is repeated for the other screw aperture 122e of the lock bar 122 and the corresponding standoff aperture 126b of the base portion 126a of the manual lock handle 126.

Figure 17A:
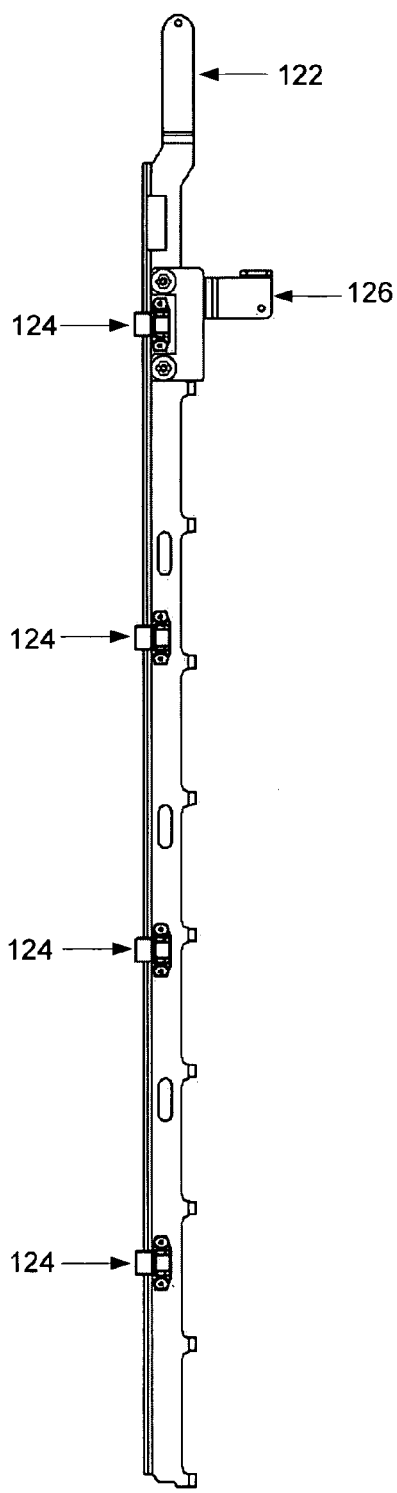
FIGS. 17A and 17B are front and right side views, respectively, of the lock bar illustrated in FIGS. 9A and 9B with the manual lock handle illustrated in FIGS. 14A through 14C attached and a plurality of the tilt-out bin lock bar clips illustrated in FIGS. 13A through 13C attached.
Figure 17B:
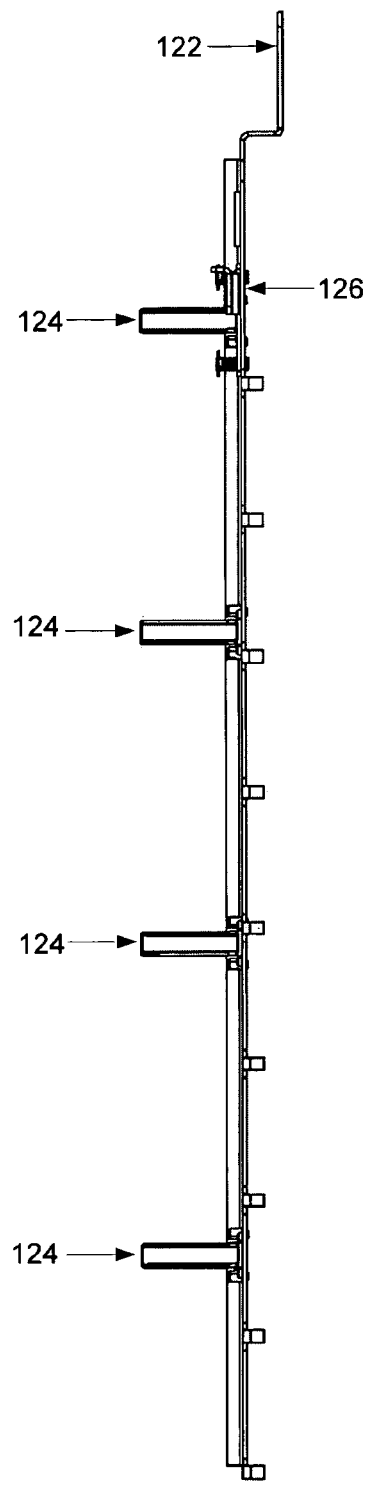

FIGS. 17A and 17B illustrate front and side views, respectively, of the lock bar 122 with four of the tilt-out bin lock bar clips 124 and the manual lock handle 126 attached thereto.

FIGS. 18A, 18B, and 18C illustrate front, side, and top views, respectively, of a manual lock bracket 136. The manual lock bracket 136 includes a base portion 136a, which includes a pair of rivet apertures 136b formed therethrough. A locking portion 136c extends from the base portion 136a and includes a lock seal aperture 136d formed therethrough.

FIGS. 19A, 19B, and 19C illustrate front, side, and top views, respectively, of a vertical channel 138. The vertical channel 138 includes a base portion 138a. A side portion 138b extends from one side of the base portion 138a. A sliding flange 138c extends from an opposite side of the base portion 138a. A front portion 138d extends from the sliding flange 138c.

The base portion 138a includes a first rectangular aperture 138e, second rectangular apertures 138f, third rectangular apertures 138g, and bolt apertures 138h. The side portion 138b includes an aperture 138i, a locking projection 138j, and a pair of rivet apertures 138k. The lock bracket 136 illustrated in FIGS. 18A, 18B, and 18C is attached to the side portion 138b of the vertical channel 138. More particularly, the rivets apertures 136b of the base portion 136a are aligned with corresponding rivet apertures 138k of the side portion 138b of the vertical channel 138, and rivets are placed therethrough.

FIGS. 20A and 20B illustrate front and side views, respectively, of a bushing 140 that is used to slidably attach the lock bar 122 to the vertical channel 138, as will be described below. The bushing 140 includes an end portion 140a, a cylindrical portion 140b, and a bolt aperture 140c formed through the end portion 140a and the cylindrical portion 140b.

Assembly and operation of the locking structure of the present invention is described with reference to FIGS. 17A through 21D. The partially assembled locking structure shown in FIGS. 17A and 17B is slidably mounted in the vertical channel shown in FIGS. 19A through 19C. More particularly, the upper end of the lock bar 122 is inserted through the rectangular aperture 138e of the base portion 138a of the vertical channel 138, and the locking portion 126c of the manual lock handle 126 is inserted through the aperture 138i of the side member 138b of the vertical channel 138, as shown in FIGS. 21A through 21D.

Figure 21A:
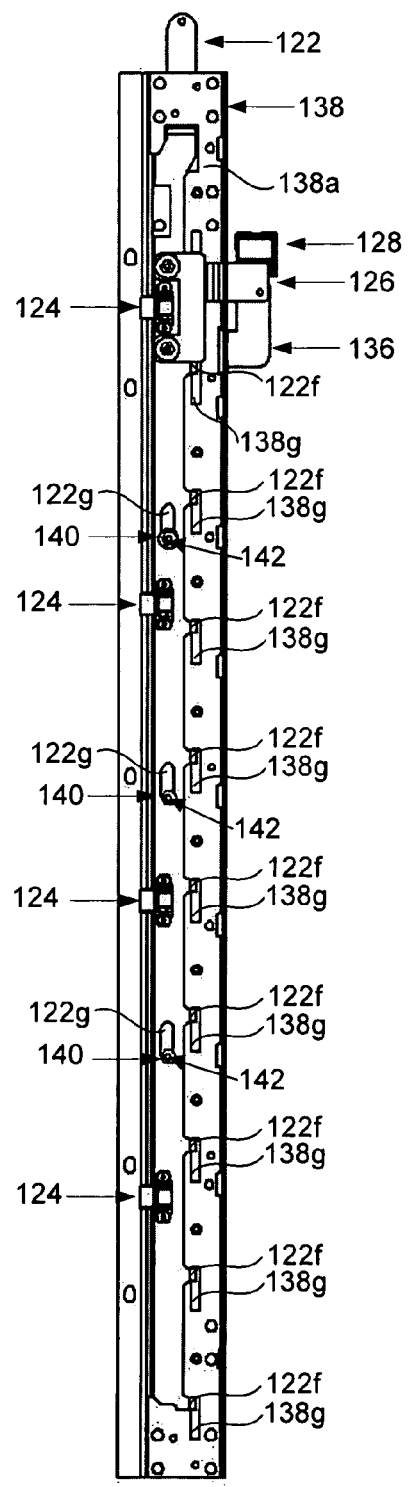
FIGS. 21A, 21B, 21C, and 21D illustrate front, right side, top, and enlarged partial right side views, respectively, of the lock bar illustrated in FIGS. 9A and 9B attached to the vertical channel illustrated in FIGS. 19A, 19B, and 19C.
Figure 21B:
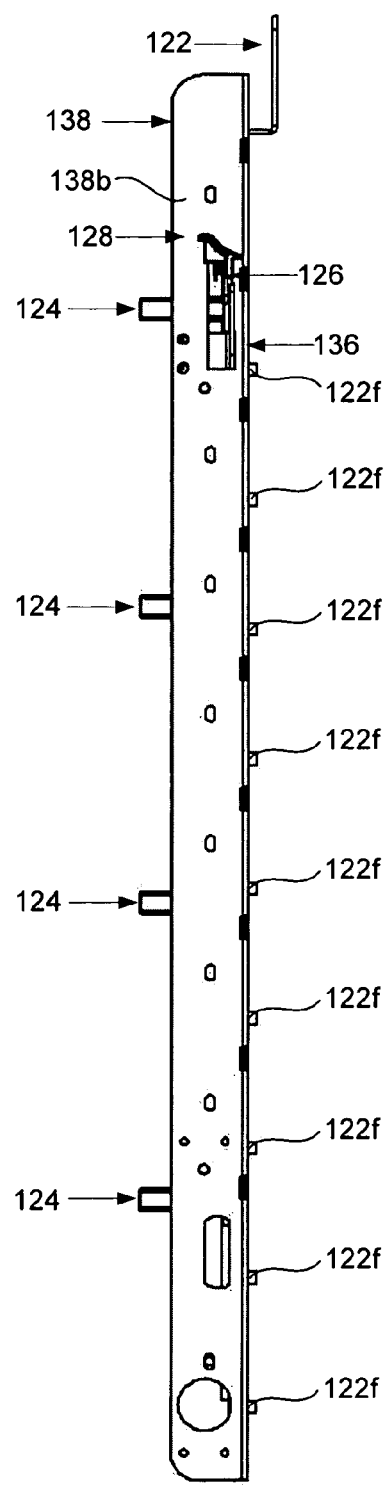
Figure 21C:
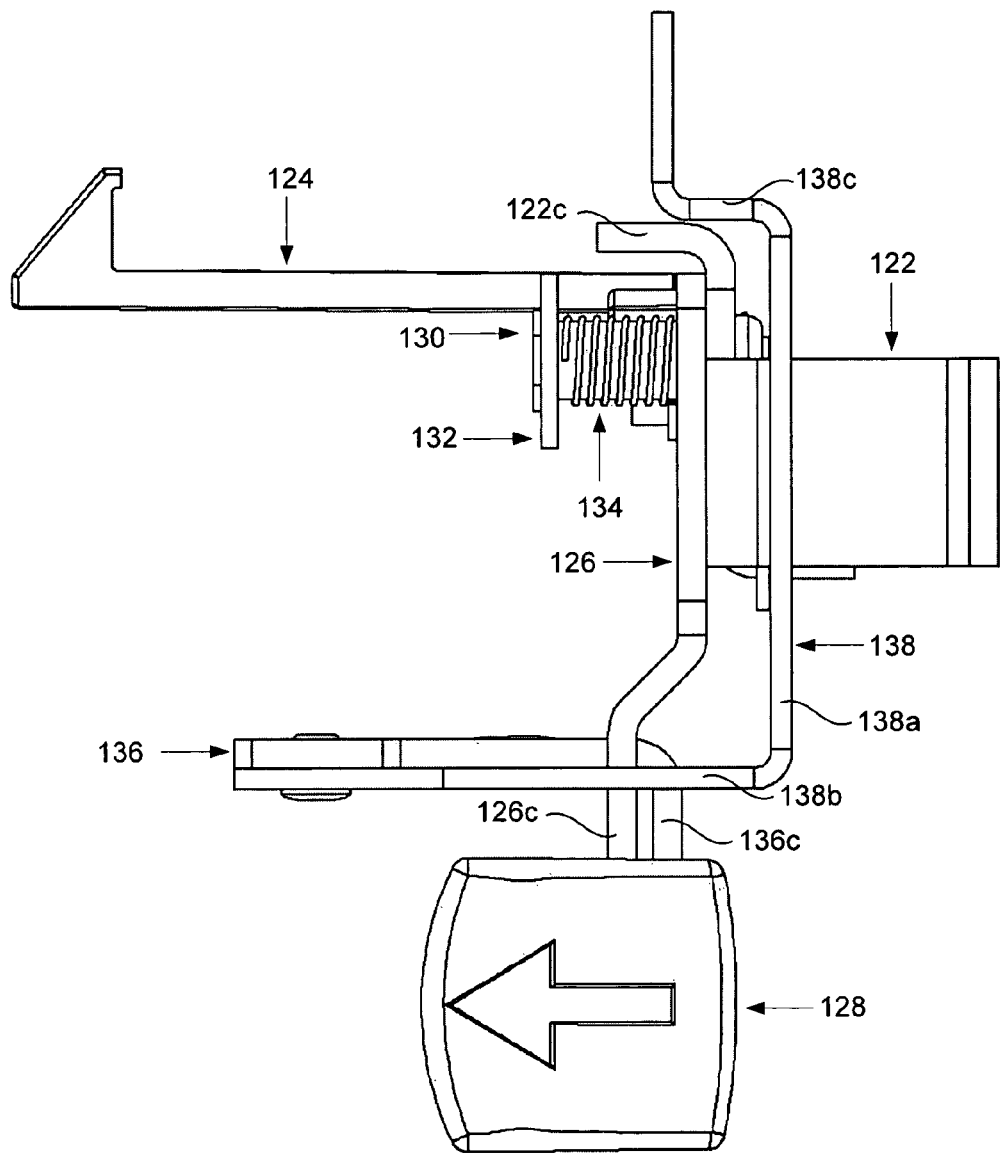

A cylindrical portion 140b of a bushing 140 is inserted through one of the oval-shaped apertures 122g of the lock bar 122 and aligned with one of the bolt apertures 138h of the base portion 138a of the vertical channel 138. A washer (not illustrated) is inserted between the base portion 138a of the vertical channel 138 and the lock bar 122 such that it contacts the end cylindrical portion 140b that does not include the end portion 140a. A bolt (not illustrated) is inserted through the bolt aperture 138h of the vertical channel 138, an aperture of the washer, and the bolt aperture 140c of the bushing 140. A nut 142 is secured to the end of the bolt, as shown in FIG. 21A. This process is repeated for the other oval-shaped apertures 122g of the lock bar 122. The lock bar 122 now is slidably attached to the vertical channel 138.

Figure 21D:
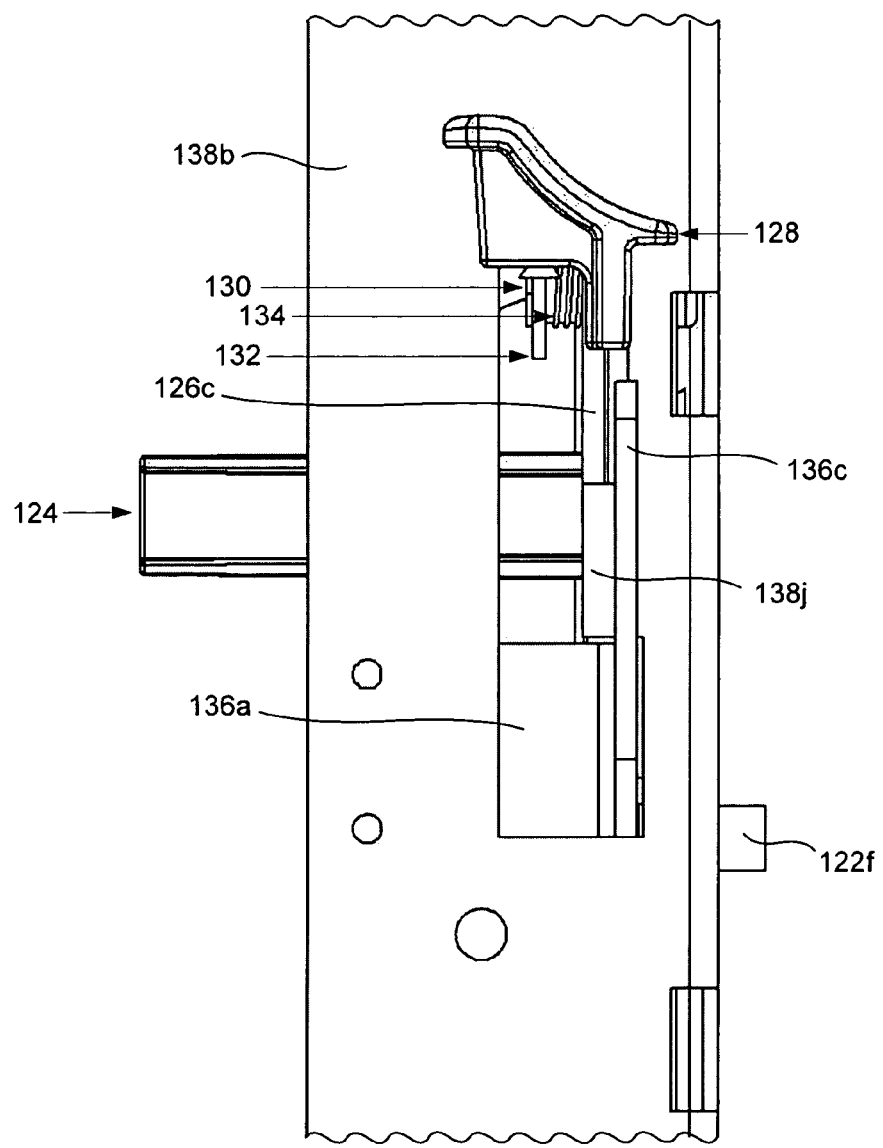

When the lock bar 122 is positioned as described, the retaining flanges 122f of the lock bar 122 protrude through the rectangular apertures 138g. The retaining flanges 122f and the rectangular apertures 138g cooperate to ensure that the lock bar 122 slides only a predetermined distance with respect to the vertical channel 138. In addition, the locking portion 126c of the manual lock handle 126 is positioned above the locking projection 138j of the vertical channel, as shown in FIG. 21D.

The assembled locking structure is positioned on the cart 100 such that the upper portion of the lock bar 122 extends through the lock bar opening 102b of the top frame 102 and the tilt-out bin lock bar clips 124 extend through the rectangular apertures 104b of the side walls 104a of the front frame 104. The locking portion 126c of the lock handle 126 and the locking portion 136c of the lock bracket 136 extend through the lock aperture 107b of the right front frame 107.

FIGS. 15A, 15B, and 15C illustrate side, top, and bottom views, respectively of a thumb latch 128, which includes a curved upper surface 128a, as shown in FIG. 15A. A lower surface of the thumb latch 128 includes a retaining portion 128b, which has a screw aperture 128c formed therein, as shown in FIG. 15C. The thumb latch 128 is attached to the lock handle 126. More particularly, a screw (not labeled) is inserted through the screw aperture 126f of the latch flange 126d of the manual lock handle 126 and advanced into the screw aperture 128c of the thumb latch 128.

As shown in FIG. 1B, the vertical channel 138 is attached to an upper horizontal member 139a and a lower horizontal member 139b of the cart 100 using a plurality of nuts and bolts (not illustrated). When the locking portion 126c of the manual lock handle 126 is disposed on the upper side of the locking projection 138j of the vertical channel 138, the locking portion 126c rests on the locking projection 138j and each of the locking tabs 124d of the bin lock bar clips 124 is disposed in front of one of the locking tabs 108c of one of the bins 108, which prevents the bins 108 from being opened.

To unlock the bins 108, an operator applies a force to the curved upper surface 128a of the thumb latch 128, which causes the locking portion 126c of the lock handle 126 to pivot away from the lock bar 122 and slide downwardly next to the locking projection 138j, which causes the lock bar 122 to move downwardly. When the lock bar 122 moves downward, the locking tabs 124d of the tilt-out bin lock bar clips 124 are lowered from in front of the locking tabs 108c of the tilt-out bins 108, which enables the tilt-out bins 108 to be opened by pulling on the handles 108a thereof.

The second section of the cart 100 may also be sealed with a frangible or severable lock seal 120. More particularly, a locking portion 120a of the lock seal 120 is inserted through the lock seal aperture 126e of the locking portion 126c of the lock handle 126 and the lock seal aperture 136d of the locking portion 136c of the lock bracket 136, and into the retaining portion 120c of the lock seal 120. When an operator depresses the thumb latch 128, movement of the lock bar 122 causes the lock seal 120 to be severed, thereby enabling access to the interior of the second section of the cart 100. If the cart 100 also has a lock seal 120 attached to the first section, as described above, when the operator depresses the thumb latch 128, movement of the lock bar 122 causes both lock seals 120 to be severed, thereby enabling access to the interior of both sections of the cart 100.

While the present invention has been described with respect to what is presently considered to be the preferred embodiments, the present invention is not limited to the disclosed embodiments. Rather, the present invention covers various modifications and equivalent arrangements included within the spirit and scope of the appended claims. The scope of the appended claims is to be accorded the broadest interpretation so as to encompass all such modifications and equivalent structures and functions.

What is claimed is:

1. A cart comprising:
a housing having a top and at least one side;
a recessed tray for storing items provided in said top of said housing;

a top cover mountable with said top of said housing for covering said tray to prevent removal of items stored in said tray, but being movable relative to said top of said housing thereby to permit access to items stored in said tray, wherein a first frangible seal retains said top cover on said recessed tray;

at least one compartment, also for storing items, accessible from the at least one side of said housing, said compartment being selectably accessible by being placed between (a) a closed condition for preventing removal of items stored therein, and (b) an open condition to permit access to items stored therein, wherein a second frangible seal retains said at least one compartment in the closed condition;

a first user-actuated mechanism for selectively breaking said first frangible seal, but not said second frangible seal; and a second user-actuated mechanism for breaking both said first frangible seal and said second frangible seal.

2. A cart comprising:

housing means including a top having a recessed tray;

cover means for covering said tray but providing access to the interior thereof when moved relative thereto, said cover means including a first cover retaining portion having a lock seal aperture formed therethrough;

at least one compartment mounted relative to one side of said housing means and being movable between an open condition providing access to its interior and a closed condition with its interior enclosed;

seal means for sealing said cover means to cover the tray and sealing said compartment in said closed condition, said seal means including a stationary member and a slide member having a lock seal aperture formed therethrough, said slide member is being movable to (a) a first position where said lock seal aperture of said slide member is aligned with said lock seal aperture of said first cover retaining portion and where said compartment is sealed in said closed condition, (b) a second position where said lock seal aperture of said slide member is not aligned with said lock seal aperture of said first cover retaining portion and where said compartment is not sealed in said closed condition; and first frangible seal means for holding said lock seal aperture of said slide member in alignment with said lock seal aperture of said cover retaining portion.

3. The cart according to claim 2, wherein said seal means includes:

a handle member attached to said slide, member, said handle member being operable from the exterior of said housing means to move said slide member from the first position to the second position.

4. The cart according to claim 3, wherein said seal means includes a handle retaining tab; and wherein said handle member is pivotably attached to said slide member, said handle member being operable to pivot in a direction generally perpendicular to the direction of lateral movement of said slide member, said handle member pivoting between a first handle position where said handle retaining tab inhibits lateral movement of said handle member, and a second handle position in which said handle retaining tab does not inhibit lateral movement of said handle member.

5. The cart according to claim 4, wherein said seal means further includes a means for biasing said handle member toward said first handle position.

6. The cart according to claim 5, wherein said seal means further includes a latch mounted to said handle member external to said housing means, said latch extending away from said handle member such that a force applied to said latch causes said handle member to pivot toward said second handle position.

7. The cart according to claim 6, wherein said latch includes an upper surface having a first end adjacent said handle member and an opposing second end, and wherein said second end is disposed above said first end.

8. The cart according to claim 3, wherein said stationary member includes bracket means having a lock seal aperture formed therethrough;

wherein said handle member includes a lock seal aperture formed therethrough, and wherein said lock seal aperture of said handle member is aligned with said lock seal aperture of said bracket means when said slide member is moved to the first position.

9. The cart according to claim 8, further comprising second frangible seal means for holding said lock seal aperture of said handle member in alignment with said lock seal aperture of said bracket.

10. The cart according to claim 9, wherein said slide member includes first severing means and said handle member includes second severing means, and wherein movement of said slide member from said first position to said second position causes said first severing means to sever said first frangible seal and causes said second severing means to sever said second frangible seal.

11. The cart according to claim 3, wherein said stationary member includes a first sliding flange and said slide member includes a second sliding flange disposed adjacent said first sliding flange.

12. The cart according to claim 3, wherein said stationary member includes a plurality of slots, and wherein said slide member includes a plurality of flanges extending through said plurality of slots.

13. The cart according to claim 3, wherein said seal means further includes a locking member fixedly mounted to said slide means, said locking member having a retaining tab extending therefrom; wherein said compartment includes a lock tab extending from an outer surface thereof; and wherein said retaining tab is disposed in front of said lock tab when said slide member is moved to said first position and said retaining tab is disposed below said lock tab when said slide member is moved to said second position.

14. The cart according to claim 13, wherein said retaining tab includes a lip formed thereon; wherein said lock tab includes a lip formed thereon; and wherein said lip of said retaining tab is disposed adjacent said lip of said lock tab when said slide member is moved to said first position.

15. The cart according to claim 14, further comprising bracket means for securing said cover means to said housing means, wherein said bracket means enables said cover means to be removed from said housing means by sliding the cover means in a predetermined direction.

16. A cart comprising:

a housing including a top having a recessed tray;

a movable cover for covering said tray but providing access to the interior thereof when moved relative thereto, said cover including a first cover retaining portion having a first lock seal aperture formed therethrough;

at least one compartment mounted relative to one side of said housing and being movable between an open condition providing access to its interior and a closed condition with its interior enclosed; and a seal mechanism for sealing (i) said cover to cover the tray and (ii) said compartment in said closed condition, said seal mechanism comprising:
  a slide member having a second lock seal aperture formed therethrough, said slide member being movable between (a) a first position where said second lock seal aperture of said slide member is aligned with said first lock seal aperture of said first cover retaining portion and where said compartment is sealed in said closed condition, and (b) a second position where said second lock seal aperture of said slide member is not aligned with said first lock seal aperture of said first cover retaining portion and where said compartment is not sealed in said closed condition; and
  a first frangible seal for holding said second lock seal aperture of said slide member in alignment with said first lock seal aperture of said cover retaining portion.

* * * * *